(12) United States Patent
Sekii et al.

(10) Patent No.: US 8,724,256 B2
(45) Date of Patent: May 13, 2014

(54) BEARING APPARATUS, SPINDLE MOTOR, AND DISK DRIVE APPARATUS

(71) Applicant: Nidec Corporation, Kyoto (JP)

(72) Inventors: Yoichi Sekii, Kyoto (JP); Hiroshi Konno, Kyoto (JP); Chiharu Fujii, Kyoto (JP); Takuro Iguchi, Kyoto (JP); Shuji Iwasaki, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/789,796

(22) Filed: Mar. 8, 2013

(65) Prior Publication Data

US 2014/0078879 A1 Mar. 20, 2014

(30) Foreign Application Priority Data

Sep. 18, 2012 (JP) .................. 2012-203803

(51) Int. Cl.
*G11B 17/03* (2006.01)
(52) U.S. Cl.
USPC ....................................... 360/99.08
(58) Field of Classification Search
CPC .................................. G11B 5/39; G11B 17/04
USPC ....................................... 360/99.08
See application file for complete search history.

(56) References Cited

U.S. PATENT DOCUMENTS

| | | |
|---|---|---|
| 5,533,811 A | 7/1996 | Polch et al. |
| 5,558,443 A | 9/1996 | Zang |
| 6,018,442 A * | 1/2000 | Verbunt et al. ............. 360/271.2 |
| 6,154,339 A * | 11/2000 | Grantz et al. .............. 360/99.08 |
| 6,211,592 B1 | 4/2001 | Ichiyama |
| 6,246,136 B1 | 6/2001 | Ichiyama |
| 6,292,328 B1 * | 9/2001 | Rahman et al. ............ 360/99.08 |
| 7,372,663 B2 * | 5/2008 | Leblanc et al. ............ 360/99.08 |
| 2004/0090702 A1 | 5/2004 | Aiello et al. |
| 2004/0096131 A1 | 5/2004 | Aiello et al. |
| 2004/0156568 A1 | 8/2004 | Woldemar et al. |
| 2004/0165797 A1 | 8/2004 | Oku et al. |

(Continued)

FOREIGN PATENT DOCUMENTS

| | | |
|---|---|---|
| JP | 06-028335 U | 4/1994 |
| JP | 06-121484 A | 4/1994 |

(Continued)

OTHER PUBLICATIONS

Kimura et al., "Dynamic Pressure Bearing and Spindle Motor Using the Same", U.S. Appl. No. 12/952,223, filed Nov. 23, 2010.

(Continued)

*Primary Examiner* — Mark Blouin
(74) *Attorney, Agent, or Firm* — Keating & Bennett, LLP

(57) ABSTRACT

A bearing apparatus includes a stationary shaft, an upper annular portion, a lower annular portion, and a sleeve. An outer circumferential surface of the upper annular portion includes a cylindrical surface and an inclined surface arranged above the cylindrical surface. The cylindrical surface has an axial length smaller than that of the inclined surface of the upper annular portion. One of an upper surface of the sleeve and a lower surface of the upper annular portion includes a pumping groove array defined therein. An upper surface of a lubricating oil is defined in an upper capillary seal portion, while a lower surface of the lubricating oil is defined in a lower capillary seal portion. The upper capillary seal portion has an opening angle larger than that of the lower capillary seal portion.

32 Claims, 14 Drawing Sheets

(56) References Cited

U.S. PATENT DOCUMENTS

| | | |
|---|---|---|
| 2004/0175062 A1 | 9/2004 | Nishimura et al. |
| 2005/0031237 A1 | 2/2005 | Gomyo et al. |
| 2005/0111769 A1 | 5/2005 | Haga |
| 2005/0225187 A1 | 10/2005 | Hafen et al. |
| 2006/0002638 A1 | 1/2006 | Ichiyama |
| 2006/0002641 A1 | 1/2006 | Ichiyama |
| 2006/0039634 A1 | 2/2006 | Ichiyama |
| 2006/0039636 A1 | 2/2006 | Ichiyama |
| 2006/0051001 A1 | 3/2006 | Nishimura et al. |
| 2006/0210205 A1 | 9/2006 | Engesser et al. |
| 2006/0222276 A1 | 10/2006 | Uenosono |
| 2007/0140606 A1 | 6/2007 | Feng et al. |
| 2007/0154123 A1 | 7/2007 | Gomyo et al. |
| 2007/0177832 A1 | 8/2007 | Gotoh et al. |
| 2007/0211971 A1 | 9/2007 | Obara et al. |
| 2008/0006332 A1 | 1/2008 | Ishizawa et al. |
| 2008/0056104 A1 | 3/2008 | Nishimura et al. |
| 2009/0129710 A1 | 5/2009 | Ito et al. |
| 2009/0140587 A1 | 6/2009 | Popov et al. |
| 2009/0140588 A1 | 6/2009 | Drautz et al. |
| 2009/0279818 A1 | 11/2009 | Le et al. |
| 2010/0124387 A1 | 5/2010 | Fuss et al. |

FOREIGN PATENT DOCUMENTS

| | | |
|---|---|---|
| JP | 07-336924 A | 12/1995 |
| JP | 2002-005171 A | 1/2002 |
| JP | 2003-092867 A | 3/2003 |
| JP | 2003-244886 A | 8/2003 |
| JP | 2004-173377 A | 6/2004 |
| JP | 2005-048890 A | 2/2005 |
| JP | 2006-226388 A | 8/2006 |
| JP | 2009-041671 A | 2/2009 |
| JP | 2009-133361 A | 6/2009 |
| JP | 2011-002024 A | 1/2011 |
| WO | 2006/120719 A1 | 11/2006 |

OTHER PUBLICATIONS

Kimura et al., "Bearing Apparatus, Spindle Motor, and Disk Drive Apparatus", U.S. Appl. No. 12/791,147, filed Jun. 1, 2010.
Oe et al., "Bearing Apparatus, Spindle Motor, and Disk Drive Apparatus", U.S. Appl. No. 12/793,851, filed Jun. 4, 2010.
Yamada et al., "Fluid Dynamic Bearing Apparatus, Spindle Motor, and Disk Drive Apparatus", U.S. Appl. No. 12/742,931, filed May 14, 2010.
Yamada et al., "Fluid Dynamic Bearing Apparatus, Spindle Motor, and Disk Drive Apparatus", U.S. Appl. No. 12/899,658, filed Oct. 7, 2010.
Yamada et al., "Fluid Dynamic Bearing Apparatus, Spindle Motor, and Disk Drive Apparatus", U.S. Appl. No. 13/299,542, filed Nov. 18, 2011.
Kimura et al., "Bearing Apparatus, Spindle Motor, and Disk Drive Apparatus", U.S. Appl. No. 13/602,420, filed Sep. 4, 2012.
Kimura et al., "Bearing Apparatus, Spindle Motor, and Disk Drive Apparatus", U.S. Appl. No. 13/681,500, filed Nov. 20, 2012.
Kimura et al., "Bearing Apparatus, Spindle Motor, and Disk Drive Apparatus", U.S. Appl. No. 13/602,348, filed Sep. 4, 2012.
Iwasaki et al., "Motor and Disk Drive Apparatus", U.S. Appl. No. 13/613,109, filed Sep. 13, 2012.
Tamaoka et al., "Motor and Disk Drive Apparatus", U.S. Appl. No. 13/613,106, filed Sep. 13, 2012.
Iwasaki et al., "Motor and Disk Drive Apparatus", U.S. Appl. No. 13/613,108, filed Sep. 13, 2012.
Sekii et al., "Spindle Motor and Disk Drive Apparatus", U.S. Appl. No. 13/767,205, filed Feb. 14, 2013.
Fukushima, "Motor and Disk Drive Apparatus," U.S. Appl. No. 13/751,380, filed Jan. 28, 2013.
Sekii et al., "Bearing Apparatus, Spindle Motor, and Disk Drive Apparatus", U.S. Appl. No. 13/790,089, filed Mar. 8, 2013.
Sato et al., "Spindle Motor and Disk Drive Apparatus", U.S. Appl. No. 13/798,857, filed Mar. 13, 2013.
Sekii, "Motor and Disk Drive Apparatus", U.S. Appl. No. 13/886,290, filed May 3, 2013.
Watanabe et al., "Spindle Motor and Disk Drive Apparatus", U.S. Appl. No. 13/898,921, filed May 21, 2013.
Kimura et al., "Bearing Mechanism, Motor, and Disk Drive Apparatus", U.S. Appl. No. 13/775,475, filed Feb. 25, 2013.
Sumiji et al., "Bearing Mechanism, Motor, and Disk Drive Apparatus", U.S. Appl. No. 13/775,467, filed Feb. 25, 2013.
Sumiji et al., "Bearing Mechanism, Motor, and Disk Drive Apparatus", U.S. Appl. No. 13/785,297, filed Mar. 5, 2013.
English translation of Official Communication issued in International Patent Application No. PCT/JP2009/059556, mailed on Jan. 20, 2011.

* cited by examiner

US 8,724,256 B2

BEARING APPARATUS, SPINDLE MOTOR, AND DISK DRIVE APPARATUS

BACKGROUND OF THE INVENTION

1. Field of the Invention

The present invention relates to a bearing apparatus, a spindle motor, and a disk drive apparatus.

2. Description of the Related Art

Spindle motors arranged to rotate disks about central axes thereof are typically installed in hard disk apparatuses and optical disk apparatuses. Such spindle motors include a stationary portion fixed to a housing of the apparatus and a rotating portion arranged to rotate while supporting the disk(s). The spindle motor is arranged to produce a torque centered on the central axis by magnetic flux generated between the stationary and rotating portions, whereby the rotating portion is caused to rotate with respect to the stationary portion.

The stationary and rotating portions of the spindle motor are joined to each other through a bearing apparatus. In recent years, in particular, spindle motors have often been provided with a bearing apparatus in which a lubricating fluid is arranged between the stationary and rotating portions. The structure of a known bearing apparatus using the lubricating fluid is described, for example, in JP-A 2009-136143.

In some bearing apparatuses using the lubricating fluid, a pumping seal including a plurality of grooves is arranged in the vicinity of a surface of the lubricating fluid. Once the spindle motor is started, the pumping seal causes the lubricating fluid to be drawn inward toward an interior of the bearing apparatus. This contributes to preventing the lubricating fluid from leaking out of the bearing apparatus. In known bearing apparatuses, such a pumping seal is often defined in a radial gap where a surface of a stationary portion and a surface of a rotating portion are radially opposed to each other.

In recent years, there has been a strong demand for a reduction in axial thickness of spindle motors as a demand for notebook personal computers, tablet personal computers, and the like has been increasing. However, when the pumping seal is defined in the radial gap as described above, it is necessary to secure a relatively large axial dimension of the pumping seal to allow the plurality of grooves to be defined in the pumping seal. This need is a factor that hinders a reduction in the thickness of the spindle motors.

In this connection, in the bearing apparatus described in JP-A 2009-136143, the pumping seal is defined in a thrust gap where a surface of a bearing component and a surface of a rotor component are axially opposed to each other (see paragraph and FIG. 1 of JP-A 2009-136143). This arrangement makes it possible to reduce the axial dimension of the pumping seal as compared to the case where the pumping seal is defined in the radial gap.

In the bearing apparatus described in JP-A 2009-136143, however, the lubricating fluid has upper and lower surfaces at two different locations, and the level of the lower surface of the lubricating fluid rises when the pumping seal causes the upper surface of the lubricating fluid to be drawn inward toward an interior of the bearing apparatus. Therefore, it is necessary to secure a relatively large axial dimension of a seal gap arranged to hold the lower surface of the lubricating fluid. This need is another factor that hinders a reduction in the thickness of the spindle motors.

SUMMARY OF THE INVENTION

A bearing apparatus according to a preferred embodiment of the present invention includes a stationary shaft, an upper annular portion, a lower annular portion, a sleeve, and a lubricating oil. The stationary shaft is arranged to extend along a central axis extending in a vertical direction. The upper annular portion preferably has a circular or substantially circular ring shape, and is arranged to project radially outward from the stationary shaft. The lower annular portion preferably has a circular or substantially circular ring shape, and is arranged to project radially outward from the stationary shaft below the upper annular portion. The sleeve is arranged between the upper and lower annular portions, and is supported to be rotatable about the central axis. The lubricating oil is arranged between the sleeve and a combination of the stationary shaft, the upper annular portion, and the lower annular portion. The lower annular portion includes a bottom plate portion and a wall portion. The bottom plate portion is arranged to extend in or substantially in a shape of a disk below the sleeve. The wall portion is arranged to extend upward from the bottom plate portion to assume a cylindrical or substantially cylindrical shape radially outside of the sleeve. The sleeve includes a first inner circumferential surface, a second inner circumferential surface, an upper surface, a lower surface, and an outer circumferential surface. The first inner circumferential surface is arranged radially opposite to an outer circumferential surface of the stationary shaft. The second inner circumferential surface is arranged radially outside of the upper annular portion. The upper surface is arranged axially opposite to a lower surface of the upper annular portion. The lower surface is arranged axially opposite to an upper surface of the bottom plate portion. The outer circumferential surface is arranged radially opposite to an inner circumferential surface of the wall portion. One of the upper surface of the sleeve and the lower surface of the upper annular portion includes a pumping groove array defined therein. The pumping groove array is arranged to send a portion of the lubricating oil which is present between the sleeve and the upper annular portion radially inward during rotation of the sleeve. The lower surface of the sleeve and the upper surface of the bottom plate portion are arranged to together define a thrust dynamic pressure bearing portion therebetween. At least one of the lower surface of the sleeve and the upper surface of the bottom plate portion which together define the thrust dynamic pressure bearing portion includes a thrust dynamic pressure groove array arranged to draw a portion of the lubricating oil which is present between the sleeve and the bottom plate portion radially inward during the rotation of the sleeve. An outer circumferential surface of the upper annular portion includes a cylindrical surface and an inclined surface. The cylindrical surface is arranged to have a uniform or substantially uniform outside diameter. The inclined surface is arranged to have an outside diameter gradually decreasing with increasing height from an upper end portion of the cylindrical surface. The inclined surface and the second inner circumferential surface are arranged to together define an upper capillary seal portion arranged to gradually increase in radial dimension with increasing height. An upper surface of the lubricating oil is defined in the upper capillary seal portion when the sleeve is in a stationary state. The outer circumferential surface of the sleeve and the inner circumferential surface of the wall portion are arranged to together define a lower capillary seal portion arranged to gradually increase in radial dimension with increasing height. A lower surface of the lubricating oil is defined in the lower capillary seal portion. The sleeve includes an upper opening defined in the upper surface thereof, a lower opening defined below the upper opening, and a communicating hole arranged to connect the upper and lower openings with each other. The upper opening is arranged radially inward of a radially outer end portion of the pumping groove array. The lower opening is arranged radially outward of an inner circumferential portion of the thrust dynamic pressure bearing portion. A radially outer edge of the lower opening is arranged at a radial position overlapping an outer circumferential portion of the thrust dynamic pressure bearing portion, or radially outward of the outer circumferential portion of the thrust dynamic pressure bearing portion. The cylindrical surface preferably has an axial length smaller than that of the inclined surface. The upper capillary seal portion preferably has an opening angle larger than that of the lower capillary seal portion. The lower capillary seal portion includes a margin portion arranged above the lower surface of the lubricating oil and below an upper end of the wall portion when the sleeve is in the stationary state. The margin portion is arranged to have a capacity greater than a volume of a portion of the lubricating oil which is held in the upper capillary seal portion when the sleeve is in the stationary state.

A bearing apparatus according to another preferred embodiment of the present invention includes a stationary shaft, an upper annular portion, a lower annular portion, a sleeve, and a lubricating oil. The stationary shaft is arranged to extend along a central axis extending in a vertical direction. The upper annular portion preferably has a circular or substantially circular ring shape, and is arranged to project radially outward from the stationary shaft. The lower annular portion preferably has a circular or substantially circular ring shape, and is arranged to project radially outward from the stationary shaft below the upper annular portion. The sleeve is arranged between the upper and lower annular portions, and is supported to be rotatable about the central axis. The lubricating oil is arranged between the sleeve and a combination of the stationary shaft, the upper annular portion, and the lower annular portion. The lower annular portion includes a bottom plate portion and a wall portion. The bottom plate portion is arranged to extend in or substantially in a shape of a disk below the sleeve. The wall portion is arranged to extend upward from the bottom plate portion to assume a cylindrical or substantially cylindrical shape radially outside of the sleeve. The sleeve includes a first inner circumferential surface, a second inner circumferential surface, an upper surface, a lower surface, and an outer circumferential surface. The first inner circumferential surface is arranged radially opposite to an outer circumferential surface of the stationary shaft. The second inner circumferential surface is arranged radially outside of the upper annular portion. The upper surface is arranged axially opposite to a lower surface of the upper annular portion. The lower surface is arranged axially opposite to an upper surface of the bottom plate portion. The outer circumferential surface is arranged radially opposite to an inner circumferential surface of the wall portion. One of the upper surface of the sleeve and the lower surface of the upper annular portion includes a pumping groove array defined therein. The pumping groove array is arranged to send a portion of the lubricating oil which is present between the sleeve and the upper annular portion radially inward during rotation of the sleeve. The lower surface of the sleeve and the upper surface of the bottom plate portion are arranged to together define a thrust dynamic pressure bearing portion therebetween. At least one of the lower surface of the sleeve and the upper surface of the bottom plate portion which together define the thrust dynamic pressure bearing portion includes a thrust dynamic pressure groove array arranged to draw a portion of the lubricating oil which is present between the sleeve and the bottom plate portion radially inward during the rotation of the sleeve. An outer circumferential surface of the upper annular portion includes a cylindrical surface and an inclined surface. The cylindrical surface is arranged to have a uniform or substantially uniform outside diameter. The inclined surface is arranged to have an outside diameter gradually decreasing with increasing height from an upper end portion of the cylindrical surface. The inclined surface and the second inner circumferential surface are arranged to together define an upper capillary seal portion arranged to gradually increase in radial dimension with increasing height. An upper surface of the lubricating oil is defined in the upper capillary seal portion when the sleeve is in a stationary state. The outer circumferential surface of the sleeve and the inner circumferential surface of the wall portion are arranged to together define a lower capillary seal portion arranged to gradually increase in radial dimension with increasing height. A lower surface of the lubricating oil is defined in the lower capillary seal portion. A labyrinth seal portion having a radial dimension smaller than that of the lower capillary seal portion is arranged above the lower capillary seal portion. The sleeve includes an upper opening defined in the upper surface thereof, a lower opening defined below the upper opening, and a communicating hole arranged to connect the upper and lower openings with each other. The upper opening is arranged radially inward of a radially outer end portion of the pumping groove array. The lower opening is arranged radially outward of an inner circumferential portion of the thrust dynamic pressure bearing portion. A radially outer edge of the lower opening is arranged at a radial position overlapping with an outer circumferential portion of the thrust dynamic pressure bearing portion, or radially outward of the outer circumferential portion of the thrust dynamic pressure bearing portion. The cylindrical surface preferably has an axial length smaller than that of the inclined surface. The upper capillary seal portion is arranged to have an opening angle larger than that of the lower capillary seal portion. The lower capillary seal portion includes a margin portion arranged above the lower surface of the lubricating oil and below the labyrinth seal portion when the sleeve is in the stationary state. The margin portion is arranged to have a capacity greater than a volume of a portion of the lubricating oil which is held in the upper capillary seal portion when the sleeve is in the stationary state.

According to the above-described preferred embodiments of the present invention, the pumping groove array is defined in one of the upper surface of the sleeve and the lower surface of the upper annular portion. In addition, the axial length of the cylindrical surface of the upper annular portion is smaller than the axial length of the inclined surface of the upper annular portion. As a result of this arrangement, a reduction in the axial dimension of each bearing apparatus is achieved. Moreover, the opening angle of the upper capillary seal portion is larger than the opening angle of the lower capillary seal portion. As a result of this arrangement, a reduction in the volume of the portion of the lubricating oil which is held in the upper capillary seal portion is achieved. This makes it possible to reduce the capacity of the margin portion of the lower capillary seal portion, and to reduce the axial dimension of the lower capillary seal portion. This in turn makes it possible to further reduce the axial dimension of each bearing apparatus.

The above and other elements, features, steps, characteristics and advantages of the present invention will become more apparent from the following detailed description of the preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a spindle motor is referred to by the term "axial direction", "axial", or "axially", that directions perpendicular or substantially perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that a vertical direction is the axial direction, and that a side on which a sleeve is arranged with respect to a bottom plate portion of a lower annular portion is defined as an upper side. The shape of each member or portion and relative positions of different members or portions will be described based on the above assumptions. It should be noted, however, that the above definitions of the vertical direction and the upper and lower sides are not meant to restrict in any way the orientation of a bearing apparatus, a spindle motor, or a disk drive apparatus according to any preferred embodiment of the present invention when in use.

Also note that the wording "parallel direction" as used in this description includes both parallel and substantially parallel directions. Also note that the wording "perpendicular direction" as used in this description includes both perpendicular and substantially perpendicular directions.

Figure 1:
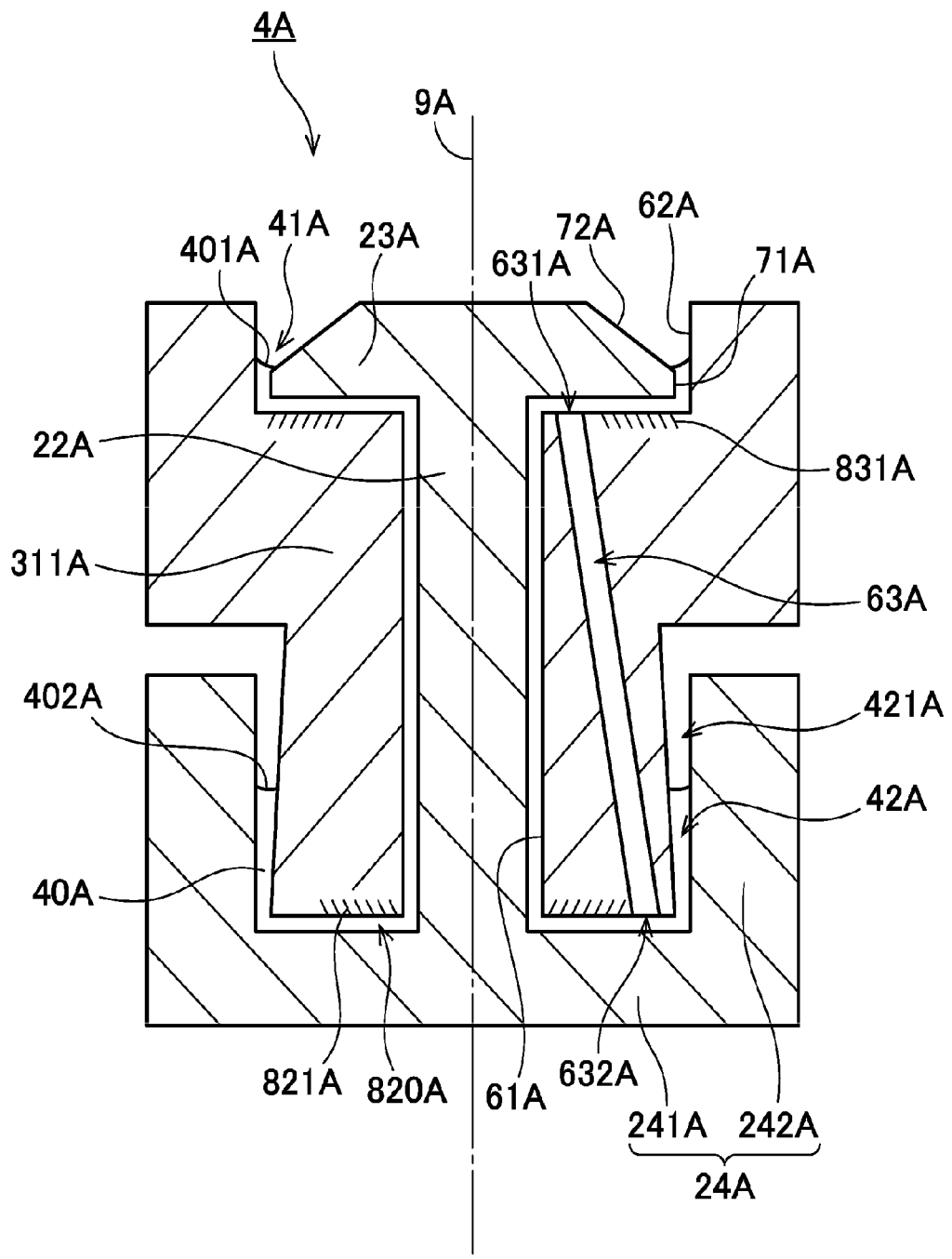
FIG. 1 is a vertical cross-sectional view of a bearing apparatus according to a first preferred embodiment of the present invention.

FIG. 1 is a vertical cross-sectional view of a bearing apparatus 4A according to a first preferred embodiment of the present invention. Referring to FIG. 1, the bearing apparatus 4A preferably includes a stationary shaft 22A, an upper annular portion 23A, a lower annular portion 24A, a sleeve 311A, and a lubricating oil 40A. The lubricating oil 40A is arranged between the sleeve 311A and a combination of the stationary shaft 22A, the upper annular portion 23A, and the lower annular portion 24A.

The stationary shaft 22A is arranged to extend along a central axis 9A extending in the vertical direction. The upper annular portion 23A is arranged to project radially outward from the stationary shaft 22A to assume a cylindrical or substantially cylindrical shape. The lower annular portion 24A is arranged to project radially outward from the stationary shaft 22A to assume the shape of a circular or substantially circular ring below the upper annular portion 23A. The lower annular portion 24A includes a bottom plate portion 241A and a wall portion 242A. The bottom plate portion 241A is arranged to extend in or substantially in the shape of a disk below the sleeve 311A. The wall portion 242A is arranged to extend upward from the bottom plate portion 241A to assume a cylindrical or substantially cylindrical shape radially outside of the sleeve 311A.

The sleeve 311A is arranged between the upper and lower annular portions 23A and 24A. The sleeve 311A is supported to be rotatable about the central axis 9A. The sleeve 311A preferably includes a communicating hole 63A. The communicating hole 63A is arranged to connect an upper opening 631A defined in an upper surface of the sleeve 311A and a lower opening 632A defined below the upper opening 631A with each other.

The upper surface of the sleeve 311A and a lower surface of the upper annular portion 23A are arranged axially opposite to each other. A lower surface of the sleeve 311A and an upper surface of the bottom plate portion 241A are arranged axially opposite to each other. An outer circumferential surface of the sleeve 311A and an inner circumferential surface of the wall portion 242A are arranged radially opposite to each other. The sleeve 311A preferably includes a first inner circumferential surface 61A and a second inner circumferential surface 62A. The first inner circumferential surface 61A is arranged radially opposite to an outer circumferential surface of the stationary shaft 22A. The second inner circumferential surface 62A is arranged radially outside of the upper annular portion 23A.

A thrust dynamic pressure bearing portion 820A is defined between the lower surface of the sleeve 311A and the upper surface of the bottom plate portion 241A. At least one of the lower surface of the sleeve 311A and the upper surface of the bottom plate portion 241A, which are arranged to together define the thrust dynamic pressure bearing portion 820A, includes a thrust dynamic pressure groove array 821A defined therein. The thrust dynamic pressure groove array 821A is arranged to draw a portion of the lubricating oil 40A which is present between the sleeve 311A and the bottom plate portion 241A radially inward during rotation of the sleeve 311A.

The lower opening 632A of the sleeve 311A is arranged radially outward of an inner circumferential portion of the thrust dynamic pressure bearing portion 820A. In addition, a radially outer edge of the lower opening 632A is preferably arranged at a radial position overlapping with an outer circumferential portion of the thrust dynamic pressure bearing portion 820A, or radially outward of the outer circumferential portion of the thrust dynamic pressure bearing portion 820A.

Moreover, one of the upper surface of the sleeve 311A and the lower surface of the upper annular portion 23A includes a pumping groove array 831A defined therein. The pumping groove array 831A is arranged to send a portion of the lubricating oil 40A which is present between the sleeve 311A and the upper annular portion 23A radially inward during the rotation of the sleeve 311A. The upper opening 631A of the sleeve 311A is arranged radially inward of a radially outer end portion of the pumping groove array 831A.

An outer circumferential surface of the upper annular portion 23A preferably includes a cylindrical surface 71A and an inclined surface 72A. The cylindrical surface 71A is arranged to have a uniform or substantially uniform outside diameter throughout its axial extent. The inclined surface 72A is arranged to have an outside diameter gradually decreasing with increasing height from an upper end portion of the cylindrical surface 71A.

In this bearing apparatus 4A, the pumping groove array 831A is preferably defined not in the second inner circumferential surface 62A or the cylindrical surface 71A but in one of the upper surface of the sleeve 311A and the lower surface of the upper annular portion 23A. As a result of this arrangement, a reduction in the axial dimension of the cylindrical surface 71A is achieved. Moreover, the cylindrical surface 71A is preferably arranged to have an axial length smaller than that of the inclined surface 72A. An additional reduction in the axial dimension of the bearing apparatus 4A is thus achieved.

The inclined surface 72A and the second inner circumferential surface 62A are arranged to together define an upper capillary seal portion 41A therebetween. At the upper capillary seal portion 41A, the radial distance between the inclined surface 72A and the second inner circumferential surface 62A is arranged to gradually increase with increasing height. An upper surface 401A of the lubricating oil 40A is arranged in the upper capillary seal portion 41A when the sleeve 311A is in a stationary state.

The outer circumferential surface of the sleeve 311A and the inner circumferential surface of the wall portion 242A are arranged to together define a lower capillary seal portion 42A therebetween. At the lower capillary seal portion 42A, the radial distance between the outer circumferential surface of the sleeve 311A and the inner circumferential surface of the wall portion 242A is arranged to gradually increase with increasing height. A lower surface 402A of the lubricating oil 40A is arranged in the lower capillary seal portion 42A.

The lower capillary seal portion 42A includes a margin portion 421A which holds no lubricating oil 40A when the sleeve 311A is in the stationary state. The margin portion 421A is arranged above the lower surface 402A of the lubricating oil 40A and below an upper end of the wall portion 242A when the sleeve 311A is in the stationary state. The volume of a portion of the lubricating oil 40A which is held in the upper capillary seal portion 41A when the sleeve 311A is in the stationary state is smaller than the capacity of the margin portion 421A.

In the bearing apparatus 4A, the upper capillary seal portion 41A is arranged to have an opening angle larger than that of the lower capillary seal portion 42A. A reduction in the volume of the portion of the lubricating oil 40A which is held in the upper capillary seal portion 41A is thus achieved. This arrangement makes it possible to reduce the capacity of the margin portion 421A of the lower capillary seal portion 42A. This in turn makes it possible to reduce the axial dimension of the lower capillary seal portion 42A. This in turn makes it possible to further reduce the axial dimension of the bearing apparatus 4A.

Figure 2:
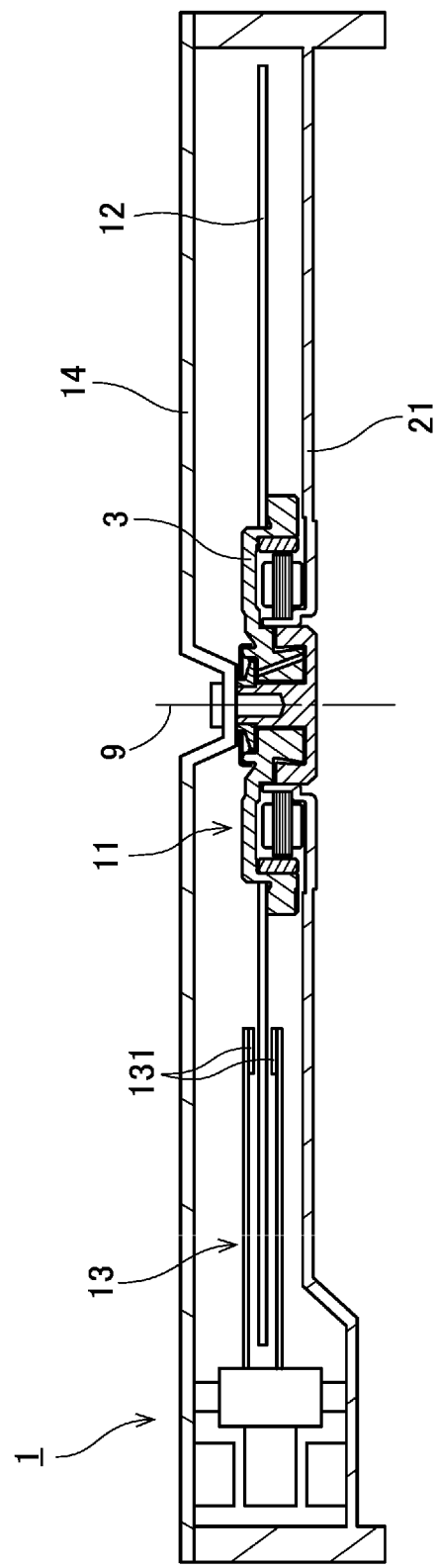
FIG. 2 is a vertical cross-sectional view of a disk drive apparatus according to a second preferred embodiment of the present invention.

FIG. 2 is a vertical cross-sectional view of a disk drive apparatus 1 according to a second preferred embodiment of the present invention. The disk drive apparatus 1 is arranged to rotate a magnetic disk 12 and perform reading and writing of information from or to the magnetic disk 12. As illustrated in FIG. 2, the disk drive apparatus 1 preferably includes a spindle motor 11, the magnetic disk 12, an access portion 13, and a cover 14.

The spindle motor 11 is arranged to rotate the magnetic disk 12 about a central axis 9 while supporting the magnetic disk 12. The spindle motor 11 includes a base portion 21 arranged to extend out from the central axis 9 in directions perpendicular to the central axis 9. An upper portion of the base portion 21 is preferably covered with the cover 14. A rotating portion 3 of the spindle motor 11, the magnetic disk 12, and the access portion 13 are accommodated inside a housing defined by the base portion 21 and the cover 14. The access portion 13 is arranged to move heads 131 along a recording surface of the magnetic disk 12 to perform the reading and writing of information from or to the magnetic disk 12.

Note that the total number of magnetic disks 12 included in the disk drive apparatus 1 may be more than one if so desired. Also note that the access portion 13 may be arranged to perform only one of the reading and writing of information from or to the magnetic disk 12.

Figure 3:
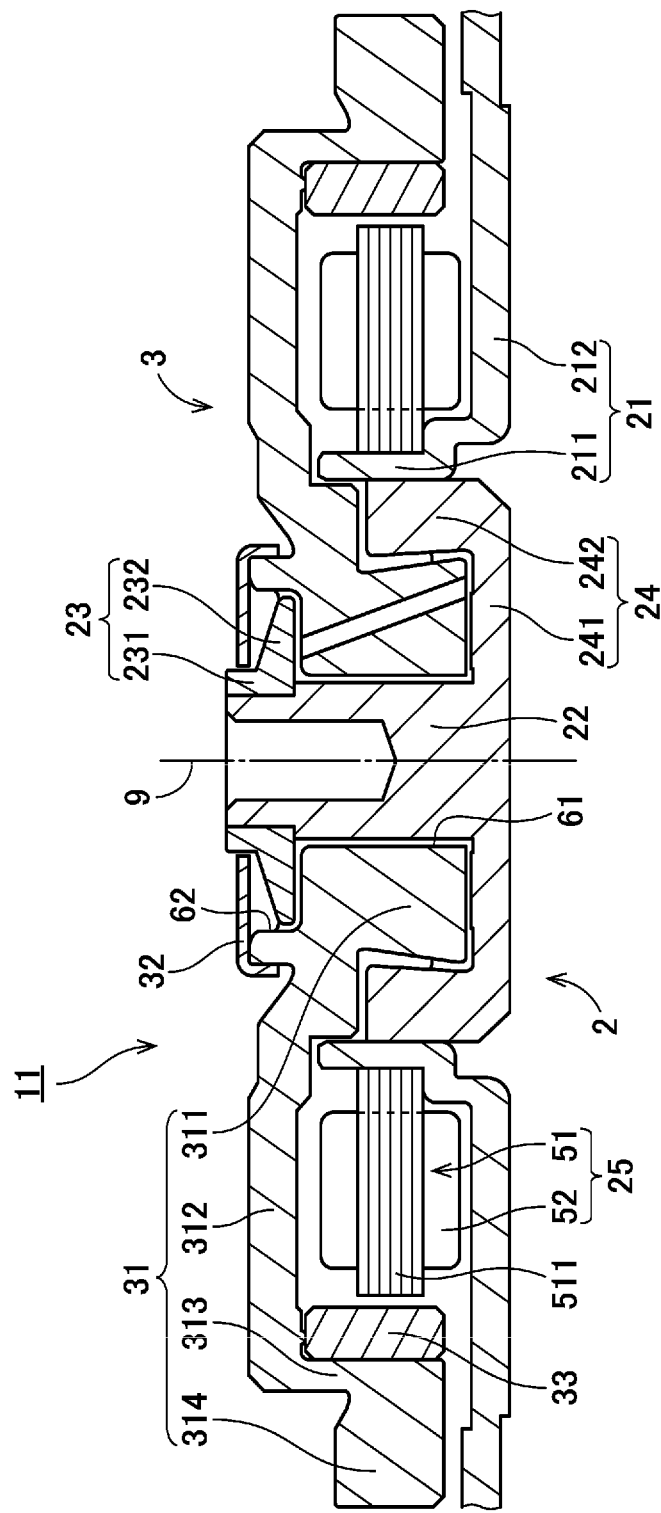
FIG. 3 is a vertical cross-sectional view of a spindle motor according to the second preferred embodiment of the present invention.

Next, the detailed structure of the spindle motor 11 will now be described below with reference to FIGS. 2 and 3. FIG. 3 is a vertical cross-sectional view of the spindle motor 11. As illustrated in FIG. 3, the spindle motor 11 includes a stationary portion 2 and the rotating portion 3. The stationary portion 2 is arranged to be stationary with respect to the base portion 21 and the cover 14. The rotating portion 3 is supported to be rotatable with respect to the stationary portion 2.

The stationary portion 2 according to the present preferred embodiment preferably includes the base portion 21, a stationary shaft 22, an upper annular portion 23, a lower annular portion 24, and a stator 25.

The base portion 21 is arranged to extend out from the central axis 9 in the directions perpendicular to the central axis 9 below the stator 25, the rotating portion 3, the magnetic disk 12, and the access portion 13. The base portion 21 is preferably made of, for example, a metal such as, for example, an aluminum alloy. As illustrated in FIG. 3, the base portion 21 preferably includes a cylindrical holder portion 211 and a plate portion 212. The cylindrical holder portion 211 is arranged to extend in the axial direction to assume a cylindrical or substantially cylindrical shape radially inside the stator 25. The plate portion 212 is arranged to extend radially outward from a lower end portion of the cylindrical holder portion 211.

The stationary shaft 22 is arranged to extend along the central axis 9. The stationary shaft 22 is preferably made of, for example, a metal such as stainless steel. As illustrated in FIG. 2, an upper end of the stationary shaft 22 is fixed to the cover 14 of the disk drive apparatus 1. Meanwhile, a lower end portion of the stationary shaft 22 is fixed to the cylindrical holder portion 211 of the base portion 21 through the lower annular portion 24.

The upper annular portion 23 preferably has a circular or substantially circular ring shape. The upper annular portion 23 is preferably made of, for example, a metal such as a copper alloy. The upper annular portion 23 is fixed to a portion of an outer circumferential surface of the stationary shaft 22 in the vicinity of the upper end of the stationary shaft 22. In addition, the upper annular portion 23 is arranged to define a portion projecting radially outward from the stationary shaft 22. Note that the stationary shaft 22 and the upper annular portion 23 may be defined by a single continuous monolithic member.

The upper annular portion 23 according to the present preferred embodiment preferably includes an annular fixing portion 231 and an annular projecting portion 232. The annular fixing portion 231 is arranged to extend in the axial direction to assume a cylindrical or substantially cylindrical shape around an upper end portion of the stationary shaft 22. An inner circumferential surface of the annular fixing portion 231 is preferably fixed to the outer circumferential surface of the stationary shaft 22 through, for example, press fitting, shrink fitting, applying an adhesive, or by any other desirable fixing method. The annular projecting portion 232 is arranged to project radially outward from a lower end portion of the annular fixing portion 231. The upper annular portion 23 is arranged to assume or substantially assume the shape of the letter "L" in a vertical section with the annular fixing portion 231 and the annular projecting portion 232.

The lower annular portion 24 is a portion that preferably has a circular or substantially circular ring shape and is provided below the upper annular portion 23. The lower annular portion 24 is arranged to project radially outward from the lower end portion of the stationary shaft 22. In the present preferred embodiment, the stationary shaft 22 and the lower annular portion 24 are preferably defined by a single continuous monolithic member. Note that the stationary shaft 22 and the lower annular portion 24 may alternatively be defined by separate members, if so desired.

The lower annular portion 24 according to the present preferred embodiment preferably includes a bottom plate portion 241 and a wall portion 242. The bottom plate portion 241 is arranged to extend radially outward from the lower end portion of the stationary shaft 22 to assume or substantially assume the shape of a disk. The bottom plate portion 241 is arranged below a sleeve 311, which will be described below. The wall portion 242 is arranged to extend upward from a radially outer edge portion of the bottom plate portion 241 to assume a cylindrical or substantially cylindrical shape. The wall portion 242 is arranged radially outside of the sleeve 311, which will be described below. In addition, the wall portion 242 is fixed to an inner circumferential surface of the cylindrical holder portion 211. The lower annular portion 24 is arranged to assume or substantially assume the shape of the letter in a vertical section with the bottom plate portion 241 and the wall portion 242.

The stator 25 preferably includes a stator core 51 and a plurality of coils 52. The stator core 51 is defined, for example, by laminated steel sheets, that is, electromagnetic steel sheets, such as silicon steel sheets, placed one upon another in the axial direction. The stator core 51 is fixed to an outer circumferential surface of the cylindrical holder portion 211. In addition, the stator core 51 preferably includes a plurality of teeth 511 arranged to project radially outward. Each of the coils 52 is preferably defined by a conducting wire wound around a separate one of the teeth 511.

The rotating portion 3 preferably includes a hub 31, a cap 32, and a magnet 33.

The hub 31 is supported to be rotatable about the central axis 9 around the stationary shaft 22. The hub 31 is preferably made, for example, of a metal such as stainless steel. The hub 31 according to the present preferred embodiment preferably includes the sleeve 311, a top plate portion 312, an outer cylindrical portion 313, and a flange portion 314. The sleeve 311 is arranged to extend in the axial direction to assume a cylindrical or substantially cylindrical shape around the stationary shaft 22. The top plate portion 312 is arranged to extend radially outward from an upper end portion of the sleeve 311. The outer cylindrical portion 313 is arranged to extend downward from a radially outer edge portion of the top plate portion 312 to assume a cylindrical or substantially cylindrical shape. The flange portion 314 is arranged to project radially outward from a lower end portion of the outer cylindrical portion 313.

The sleeve 311 is arranged axially between the annular projecting portion 232 of the upper annular portion 23 and the bottom plate portion 241 of the lower annular portion 24. An upper surface of the sleeve 311 and a lower surface of the annular projecting portion 232 are arranged axially opposite to each other. A lower surface of the sleeve 311 and an upper surface of the bottom plate portion 241 are arranged axially opposite to each other. An outer circumferential surface of the sleeve 311 and an inner circumferential surface of the wall portion 242 are arranged radially opposite to each other. The sleeve 311 preferably includes a first inner circumferential surface 61 and a second inner circumferential surface 62. The first inner circumferential surface 61 is arranged radially opposite to the outer circumferential surface of the stationary shaft 22. The second inner circumferential surface 62 is arranged above the first inner circumferential surface 61 and radially outside of the upper annular portion 23.

A lower surface of the magnetic disk 12 is arranged to be in contact with at least a portion of an upper surface of the flange portion 314. The magnetic disk 12 is thus axially positioned. In addition, an inner circumferential portion of the magnetic disk 12 is arranged to be in contact with at least a portion of an outer circumferential surface of the outer cylindrical portion 313. Thus, the magnetic disk 12 is radially positioned. As described above, in the present preferred embodiment, the outer cylindrical portion 313 and the flange portion 314 are arranged to together define a support portion that supports the magnetic disk 12.

The cap 32 is in or substantially in the shape of a disk including a circular hole at a center thereof. The cap 32 is fixed to the hub 31, and is arranged to extend in an annular shape above the sleeve 311 and the annular projecting portion 232. In addition, an inner circumferential portion of the cap 32 is arranged radially opposite to an outer circumferential surface of the annular fixing portion 231 with a slight gap intervening therebetween. The cap 32 may preferably be made of, for example, a metal or a resin.

The magnet 33 is arranged radially outside of the stator 25, and is fixed to an inner circumferential surface of the outer cylindrical portion 313. The magnet 33 according to the present preferred embodiment preferably has a circular or substantially circular ring shape. An inner circumferential surface of the magnet 33 is arranged radially opposite to a radially outer end surface of each of the teeth 511. In addition, the inner circumferential surface of the magnet 33 includes north and south poles arranged to alternate with each other in a circumferential direction.

Note that a plurality of magnets may be used in place of the magnet 33 in the shape of a circular or substantially circular ring if so desired. In the case where the plurality of magnets are used, the magnets are arranged such that north and south poles alternate with each other in the circumferential direction.

Once electrical drive currents are supplied to the coils 52 in the spindle motor 11 described above, magnetic flux is generated around each of the teeth 511. Then, interaction between the magnetic flux of the teeth 511 and the magnetic flux of the magnet 33 produces a circumferential torque between the stationary portion 2 and the rotating portion 3, so that the rotating portion 3 is caused to rotate about the central axis 9 with respect to the stationary portion 2. The magnetic disk 12, which is supported by the hub 31, is caused to rotate about the central axis 9 together with the rotating portion 3.

Figure 4:
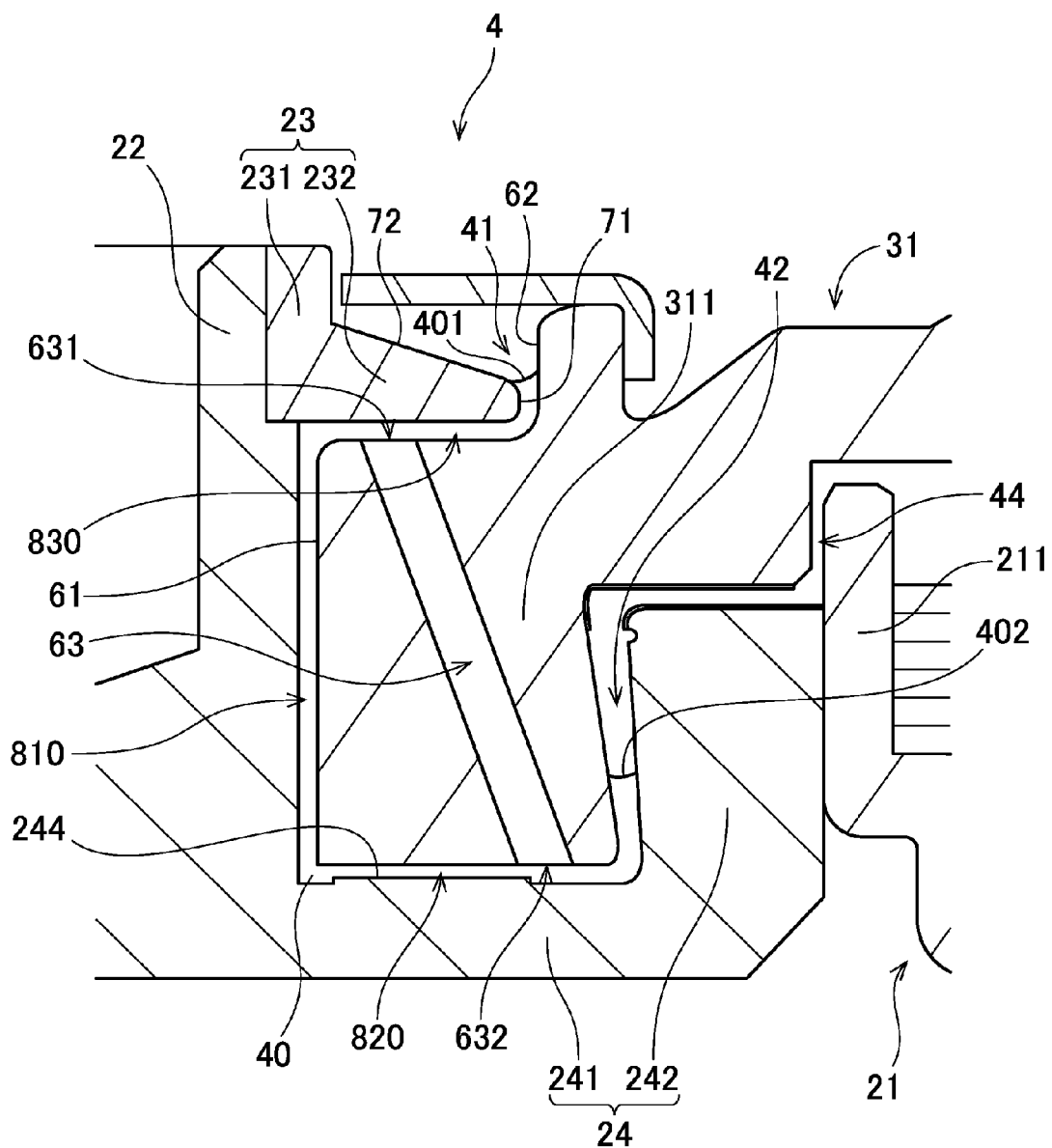
FIG. 4 is a partial vertical cross-sectional view of the spindle motor according to the second preferred embodiment of the present invention.

Next, the structure of a fluid dynamic bearing apparatus 4 included in the spindle motor 11 will now be described below. FIG. 4 is a partial vertical cross-sectional view of the spindle motor 11, illustrating the fluid dynamic bearing apparatus 4 and its vicinity. As illustrated in FIG. 4, a lubricating oil 40 is arranged between the sleeve 311 and a combination of the stationary shaft 22, the upper annular portion 23, and the lower annular portion 24. The lubricating oil 40 includes an upper surface 401, i.e., an upper liquid surface, and a lower surface 402, i.e., a lower liquid surface. An polyolester oil or a diester oil, for example, is preferably used as the lubricating oil 40. The sleeve 311 is supported through the lubricating oil 40 such that the sleeve 311 is rotatable with respect to the stationary shaft 22, the upper annular portion 23, and the lower annular portion 24.

That is, the fluid dynamic bearing apparatus 4 according to the present preferred embodiment is defined by the stationary shaft 22, the upper annular portion 23, the lower annular portion 24, the sleeve 311, and the lubricating oil 40, which is arranged between the sleeve 311 and the combination of the stationary shaft 22, the upper annular portion 23, and the lower annular portion 24. The rotating portion 3 is supported through the lubricating oil 40 such that the rotating portion 3 is rotatable with respect to the stationary portion 2.

The sleeve 311 preferably includes a communicating hole 63. The communicating hole 63 is arranged to axially connect an upper opening 631 defined in the upper surface of the sleeve 311 and a lower opening 632 defined in the lower surface of the sleeve 311 with each other. An inside of the communicating hole 63 is also filled with the lubricating oil 40.

Figure 5:
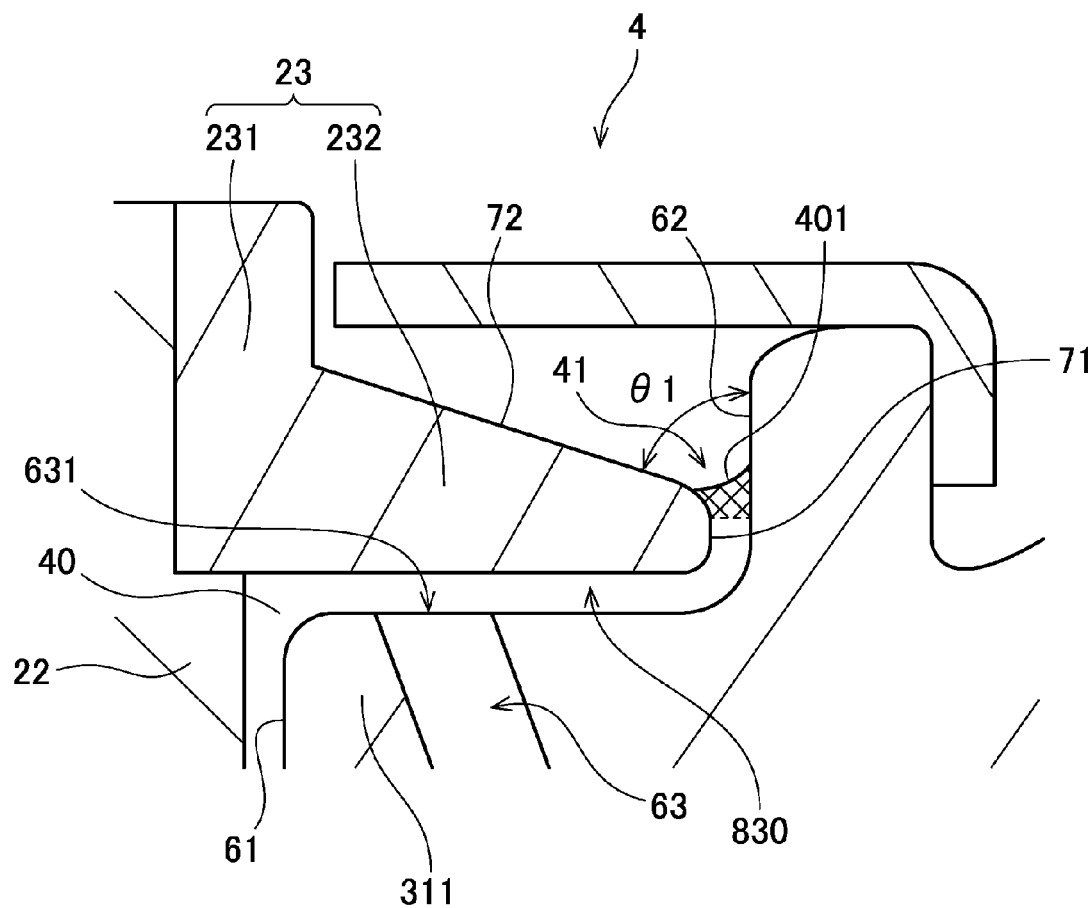
FIG. 5 is a partial vertical cross-sectional view of a fluid dynamic bearing apparatus according to the second preferred embodiment of the present invention.

FIG. 5 is a partial vertical cross-sectional view of the fluid dynamic bearing apparatus 4, illustrating the upper surface 401 of the lubricating oil 40 and its vicinity. As illustrated in FIGS. 4 and 5, an outer circumferential surface of the annular projecting portion 232 includes a cylindrical surface 71 and an inclined surface 72. The cylindrical surface is arranged to have a uniform or substantially uniform outside diameter throughout its axial extent. The inclined surface 72 is arranged to have an outside diameter gradually decreasing with increasing height from an upper end portion of the cylindrical surface 71. The inclined surface 72 of the annular projecting portion 232 and the second inner circumferential surface 62 of the sleeve 311 are arranged to together define an upper capillary seal portion 41 therebetween. At the upper capillary seal portion 41, the radial distance between the inclined surface 72 and the second inner circumferential surface 62 is arranged to gradually increase with increasing height.

When the sleeve 311 is in a stationary state, the upper surface 401 of the lubricating oil 40 is defined in the upper capillary seal portion 41 as illustrated in FIG. 5. The upper surface 401 of the lubricating oil 40 defines a meniscus in the upper capillary seal portion 41.

Figure 6:
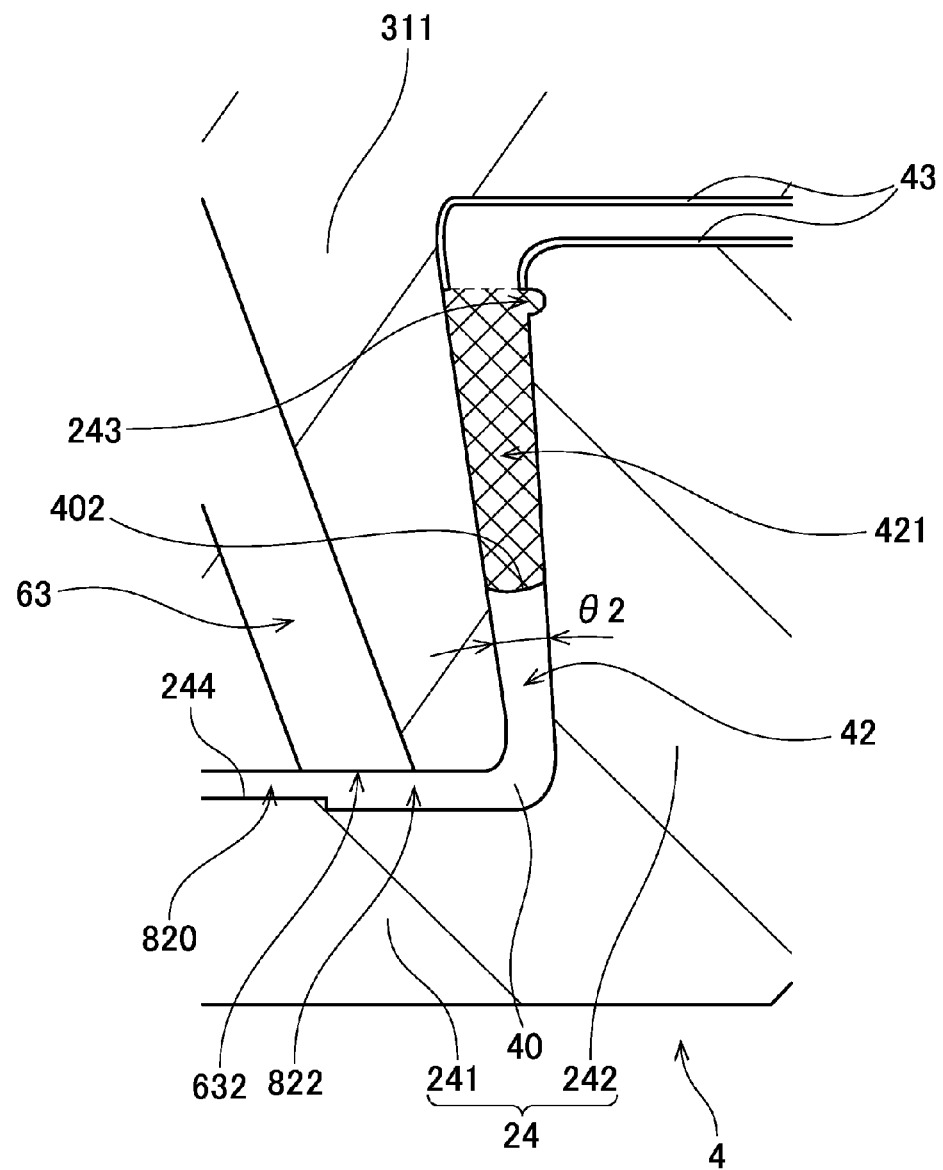
FIG. 6 is a partial vertical cross-sectional view of the fluid dynamic bearing apparatus according to the second preferred embodiment of the present invention.

FIG. 6 is a partial vertical cross-sectional view of the fluid dynamic bearing apparatus 4, illustrating the lower surface 402 of the lubricating oil 40 and its vicinity. As illustrated in FIG. 6, the outer circumferential surface of the sleeve 311 and the inner circumferential surface of the wall portion 242 are arranged to together define a lower capillary seal portion 42 therebetween. At the lower capillary seal portion 42, the radial distance between the outer circumferential surface of the sleeve 311 and the inner circumferential surface of the wall portion 242 is arranged to gradually increase with increasing height. The lower surface 402 of the lubricating oil 40 is defined in the lower capillary seal portion 42. The lower surface 402 of the lubricating oil 40 defines a meniscus in the lower capillary seal portion 42.

The lower capillary seal portion 42 includes a margin portion 421 indicated by cross-hatching in FIG. 6. In the present preferred embodiment, the margin portion 421 is preferably arranged above the lower surface 402 of the lubricating oil 40 and below lower end portions of oil-repellent films 43, which will be described below. The volume of a portion of the lubricating oil 40 which is held in the upper capillary seal portion 41 when the sleeve 311 is in the stationary state (i.e., a portion of the lubricating oil 40 which is indicated by cross-hatching in FIG. 5) is preferably smaller than the capacity of the margin portion 421. Once the sleeve 311 starts rotating, the upper surface 401 of the lubricating oil 40 is drawn inward by action of a pumping seal portion 830, which will be described below. As a result, the position of the lower surface 402 of the lubricating oil 40 rises. The rising lower surface 402 comes into the margin portion 421 and is held therein.

In the fluid dynamic bearing apparatus 4, the upper capillary seal portion 41 illustrated in FIG. 5 is preferably arranged to have an opening angle $\theta1$ larger than an opening angle $\theta2$ of the lower capillary seal portion 42 illustrated in FIG. 6. A reduction in the volume of the portion of the lubricating oil 40 which is held in the upper capillary seal portion 41 when the sleeve 311 is in the stationary state is thus achieved. The reduction in the volume of the portion of the lubricating oil 40 which is held in the upper capillary seal portion 41 leads to a reduction in the degree to which the lower surface 402 rises when the sleeve 311 starts rotating. This makes it possible to reduce the capacity of the margin portion 421 of the lower capillary seal portion 42. This in turn makes it possible to reduce the axial dimension of the lower capillary seal portion 42 and the axial dimension of the bearing apparatus 4.

The opening angle $\theta1$ of the upper capillary seal portion 41 is preferably about twice or more than twice the opening angle $\theta2$ of the lower capillary seal portion 42, and more preferably about three or more times the opening angle $\theta2$ of the lower capillary seal portion 42. For example, the opening angle $\theta1$ of the upper capillary seal portion 41 and the opening angle $\theta2$ of the lower capillary seal portion 42 may preferably be about 45 or more degrees and in the range of about 3 degrees to about 15 degrees, respectively.

In addition, as illustrated in FIG. 6, in the present preferred embodiment, a portion of a surface of the sleeve 311 and a portion of a surface of the wall portion 242 are covered with the oil-repellent films 43. The lower end portion of each oil-repellent film 43 is arranged above the lower surface 402 of the lubricating oil 40. If the lower surface 402 of the lubricating oil 40 rises up to a level of the lower end portion of either oil-repellent film 43, the lower surface 402 of the lubricating oil 40 is repelled by the oil-repellent film 43. This arrangement reduces the likelihood that the lubricating oil 40 will leak above the lower end portion of either oil-repellent film 43.

Moreover, in the present preferred embodiment, the inner circumferential surface of the wall portion 242 preferably includes an annular groove 243 defined therein. The annular groove 243 is arranged above the lower surface 402 of the lubricating oil 40 when the sleeve 311 is in the stationary state. Each oil-repellent film 43 is arranged above the annular groove 243. When the spindle motor 11 is manufactured, an oil-repellent agent, which will become the oil-repellent film 43 after being solidified, may drip downward. However, a portion of the oil-repellent agent which drips downward will preferably be held in the annular groove 243. This reduces the likelihood that the oil-repellent agent will drip below the annular groove 243.

Furthermore, as illustrated in FIG. 4, the spindle motor 11 preferably includes a labyrinth seal portion 44 arranged radially outward of the lower capillary seal portion 42. In the present preferred embodiment, the labyrinth seal portion 44 is preferably defined between the cylindrical holder portion 211 and the hub 31. The radial distance between the cylindrical holder portion 211 and the hub 31 at the labyrinth seal portion is arranged to be shorter than the radial distance between the wall portion 242 and the sleeve 311 at the lower capillary seal portion 42. This contributes to reducing an entrance and exit of a gas through the labyrinth seal portion 44. This contributes to reducing evaporation of the lubricating oil 40 through the lower surface 402.

Figure 7:
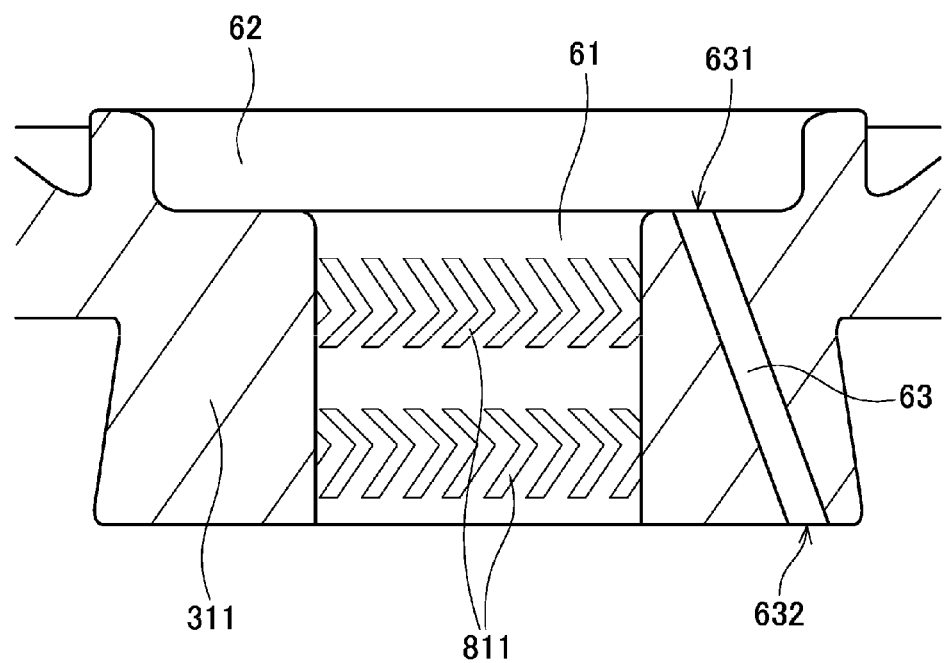
FIG. 7 is a vertical cross-sectional view of a sleeve according to the second preferred embodiment of the present invention.

FIG. 7 is a vertical cross-sectional view of the sleeve 311. A radial dynamic pressure bearing portion 810 will now be described below with reference to FIGS. 4 and 7. As illustrated in FIG. 7, the first inner circumferential surface 61 of the sleeve 311 preferably includes upper and lower radial dynamic pressure groove arrays 811 each of which is preferably arranged in a herringbone pattern, for example. During driving of the spindle motor 11, the sleeve 311 rotates in one direction with respect to the stationary shaft 22. Each radial dynamic pressure groove array 811 is arranged to draw in a portion of the lubricating oil 40 which is present between the stationary shaft 22 and the sleeve 311 toward a center of the radial dynamic pressure groove array 811 at this time. This arrangement enables the sleeve 311 to be supported radially with respect to the stationary shaft 22.

That is, in the present preferred embodiment, the radial dynamic pressure bearing portion 810, which is arranged to produce a radial supporting force, is defined between the outer circumferential surface of the stationary shaft 22, which is a bearing surface in the stationary portion 2, and the first inner circumferential surface 61 of the sleeve 311, which is a bearing surface in the rotating portion 3. Note that it is enough that the radial dynamic pressure groove arrays 811 should be defined in at least one of the outer circumferential surface of the stationary shaft 22 and the first inner circumferential surface 61 of the sleeve 311 which are arranged to together define the radial dynamic pressure bearing portion 810.

Figure 8:
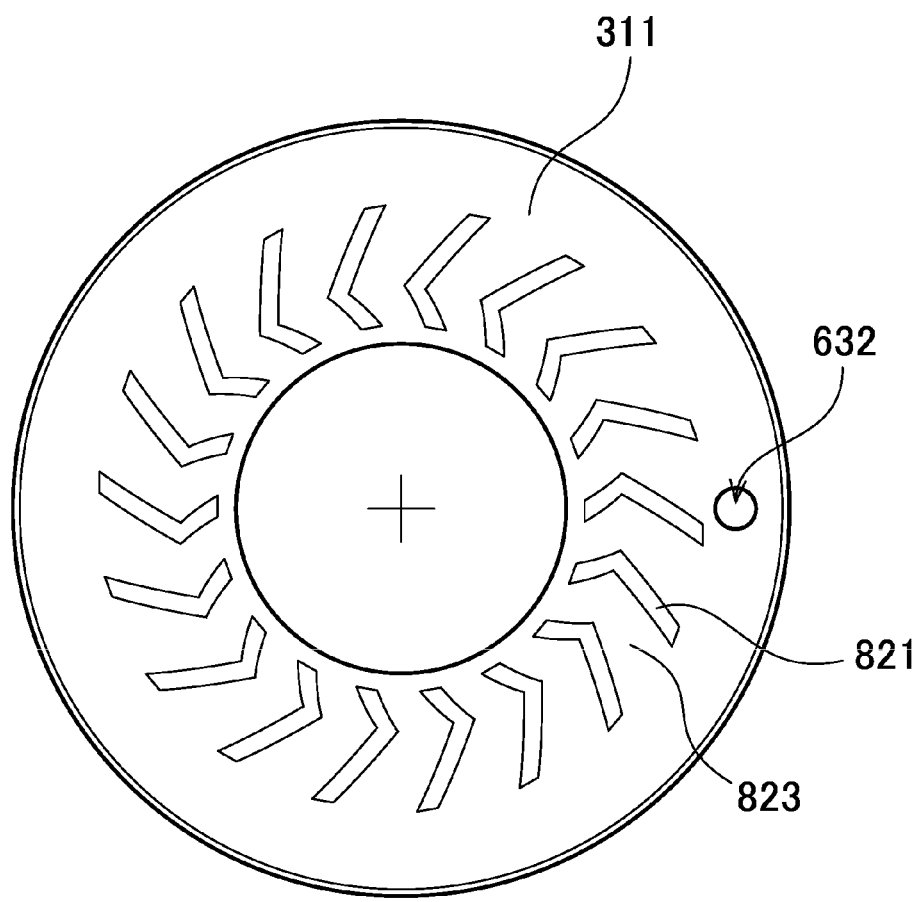
FIG. 8 is a bottom view of the sleeve according to the second preferred embodiment of the present invention.

FIG. 8 is a bottom view of the sleeve 311. As illustrated in FIG. 8, the lower surface of the sleeve 311 preferably includes a thrust dynamic pressure groove array 821 preferably arranged in a herringbone pattern, for example. During the driving of the spindle motor 11, the sleeve 311 rotates in one direction with respect to the lower annular portion 24. The thrust dynamic pressure groove array 821 is arranged to draw a portion of the lubricating oil 40 which is present between the bottom plate portion 241 and the sleeve 311 radially inward at this time. This arrangement enables the sleeve 311 to be supported axially with respect to the lower annular portion 24.

As illustrated in FIGS. 4 and 6, the upper surface of the bottom plate portion 241 preferably includes a thrust bearing surface 244 arranged to project slightly upward. The thrust dynamic pressure groove array 821 is defined in a portion of the lower surface of the sleeve 311 which is opposite to the thrust bearing surface 244. That is, in the present preferred embodiment, a thrust dynamic pressure bearing portion 820, which is arranged to produce an axial supporting force, is defined between the thrust bearing surface 244, which is a bearing surface in the stationary portion 2, and the lower surface of the sleeve 311, which is a bearing surface in the rotating portion 3.

The axial distance between the thrust bearing surface 244 and the lower surface of the sleeve 311 preferably is shorter than the axial distance between the lower surface of the annular projecting portion 232 and the upper surface of the sleeve 311 when the spindle motor 11 is running at a rated speed. A short axial distance between the thrust bearing surface 244 and the lower surface of the sleeve 311 leads to an increase in the axial supporting force produced by the thrust dynamic pressure bearing portion 820.

Note that it is enough that the thrust dynamic pressure groove array 821 should be defined in at least one of the thrust bearing surface 244 and the lower surface of the sleeve 311 which are arranged to together define the thrust dynamic pressure bearing portion 820. Also note that the thrust dynamic pressure groove array 821 may be arranged to extend radially outward beyond the thrust bearing surface 244. Also note that the upper surface of the bottom plate portion 241 may be arranged to be flat and flush with the lower surface of the sleeve 311 including a thrust bearing surface arranged to project slightly downward. Also note that the thrust dynamic pressure groove array 821 may alternatively be a groove array arranged in a spiral pattern to draw the lubricating oil 40 radially inward during rotation of the sleeve 311.

Moreover, referring to FIG. 6, in the present preferred embodiment, a gap between the lower surface of the sleeve 311 and the upper surface of the bottom plate portion 241 includes a wide gap portion 822 arranged radially outward of the thrust dynamic pressure bearing portion 820. The axial distance between the sleeve 311 and the bottom plate portion 241 preferably is longer at the wide gap portion 822 than at the thrust dynamic pressure bearing portion 820.

Referring to FIG. 8, in the present preferred embodiment, the lower opening 632 of the communicating hole 63 is arranged radially outward of the thrust dynamic pressure groove array 821. The lower opening 632 is preferably arranged at least radially outward of an inner circumferential portion of the thrust dynamic pressure bearing portion 820. In addition, a radially outer edge of the lower opening 632 is preferably arranged at a radial position overlapping with an outer circumferential portion of the thrust dynamic pressure bearing portion 820, or radially outward of the outer circumferential portion of the thrust dynamic pressure bearing portion 820.

Referring to FIG. 6, in the present preferred embodiment, the lower opening 632 of the communicating hole 63 is arranged to be open toward the wide gap portion 822. This reduces the likelihood that, if an air bubble is generated in the lubricating oil 40 because of a pumping groove array 831, which will be described below, the air bubble will enter into the thrust dynamic pressure bearing portion 820. The air bubble will then pass through the communicating hole 63 and the wide gap portion 822 to the lower capillary seal portion 42 so as to be discharged to an outside through the lower surface 402 of the lubricating oil 40.

Figure 9:
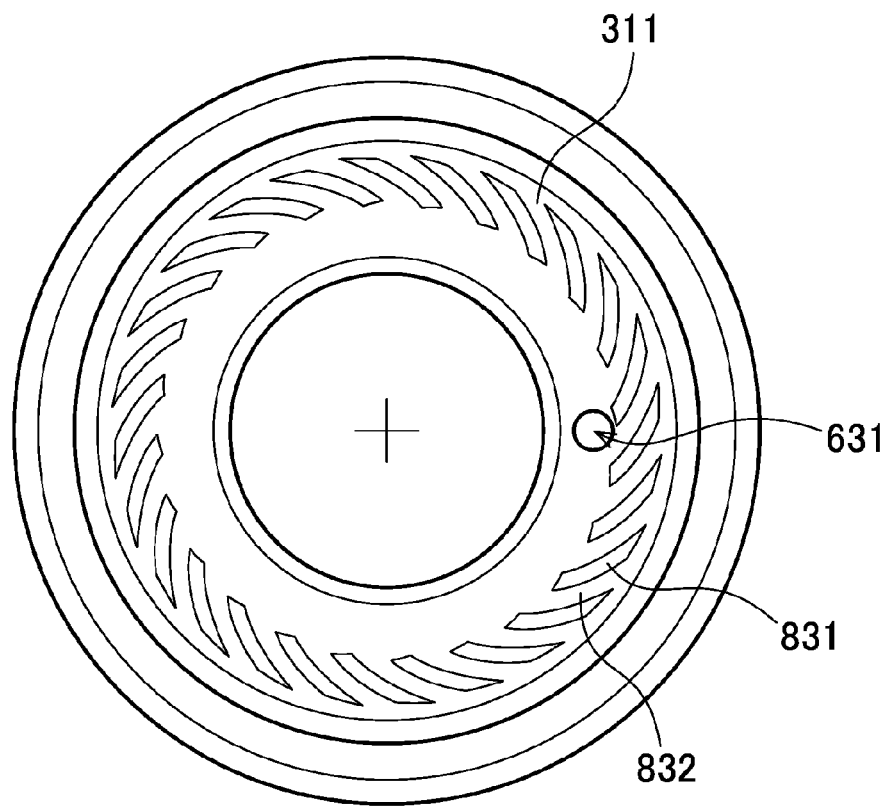
FIG. 9 is a top view of the sleeve according to the second preferred embodiment of the present invention.

The pumping groove array 831 will now be described below with reference to FIGS. 4 and 9. FIG. 9 is a top view of the sleeve 311. As illustrated in FIG. 9, the upper surface of the sleeve 311 includes the pumping groove array 831, which is preferably arranged in a spiral pattern. The upper opening 631 of the communicating hole 63 is arranged radially inward of the pumping groove array 831. The upper opening 631 is preferably arranged at least radially inward of a radially outer end portion of the pumping groove array 831.

Once the spindle motor 11 is started, the sleeve 311 rotates in one direction with respect to the upper annular portion 23. The pumping groove array 831 is arranged to send a portion of the lubricating oil 40 which is present between the sleeve 311 and the annular projecting portion 232 radially inward. As a result, the upper surface 401 of the lubricating oil 40 moves inward toward an interior of the bearing apparatus. This reduces the likelihood that the lubricating oil 40 will leak out of the bearing apparatus through a gap between the upper annular portion 23 and the sleeve 311.

That is, in the present preferred embodiment, the pumping seal portion 830, which is arranged to send the lubricating oil 40 toward the communicating hole 63, is defined between the lower surface of the annular projecting portion 232, which is a surface in the stationary portion 2, and the upper surface of the sleeve 311, which is a surface in the rotating portion 3. Note that it is enough that the pumping groove array 831 should be defined in at least one of the lower surface of the annular projecting portion 232 and the upper surface of the sleeve 311 which are arranged to together define the pumping seal portion 830.

Note that the pumping groove array may alternatively be a groove array arranged in a herringbone pattern. In the case where the groove array arranged in the herringbone pattern is adopted, each groove of the groove array is arranged to produce a greater radially inward dynamic pressure with a portion of the groove which is radially outward of a bending point of the groove than a radially outward dynamic pressure produced with a portion of the groove which is radially inward of the bending point. For example, the portion of each groove which is radially outward of the bending point is arranged to have a greater length or width than that of the portion of the groove which is radially inward of the bending point so that the pumping groove array 831 as a whole may be arranged to send the lubricating oil 40 radially inward. Note that, in the case where a groove array arranged in the spiral pattern is adopted, each groove of the groove array does not produce a radially outward pressure, and the lubricating oil 40 can therefore be sent radially inward more efficiently.

As described above, in the fluid dynamic bearing apparatus 4, the pumping groove array 831 is preferably defined not in the second inner circumferential surface 62 or the cylindrical surface 71 but in one of the lower surface of the annular projecting portion 232 and the upper surface of the sleeve 311. That is, the pumping groove array 831 is defined in a surface perpendicular or substantially perpendicular to the central axis 9. In addition, the pumping seal portion 830 is preferably defined not in a radial gap but in a thrust gap. Accordingly, a reduction in the axial dimension of the pumping groove array 831 is achieved. In addition, a reduction in the axial length of the cylindrical surface 71 is also achieved. In the fluid dynamic bearing apparatus 4, the cylindrical surface preferably has an axial length smaller than that of the inclined surface 72. An additional reduction in the axial dimension of the fluid dynamic bearing apparatus 4 is thus achieved.

Referring to FIG. 9, in the present preferred embodiment, a first hill surface 832 is preferably arranged to extend between every adjacent pair of grooves of the pumping groove array 831. In addition, referring to FIG. 8, in the present preferred embodiment, a second hill surface 823 is preferably arranged to extend between every adjacent pair of grooves of the thrust dynamic pressure groove array 821. Each first hill surface 832 preferably has a circumferential width smaller than that of each second hill surface 823. This is because required functions of the pumping groove array 831 and the thrust dynamic pressure groove array 821 are different. Specifically, the width of each groove of the pumping groove array 831 and the width of each first hill surface 832 are preferably equal or substantially equal to each other so that the pumping groove array 831 can efficiently produce a radially inward dynamic pressure. In contrast, the width of each second hill surface 823 is preferably greater than the width of each groove of the thrust dynamic pressure groove array 821 in order to increase rigidity of the thrust dynamic pressure bearing portion 820. A damping effect tends to easily occur between each second hill surface 823 and the upper surface of the bottom plate portion 241 when the second hill surface 823 has a large width. This leads to an increase in the rigidity of the thrust dynamic pressure bearing portion 820.

Figure 10:
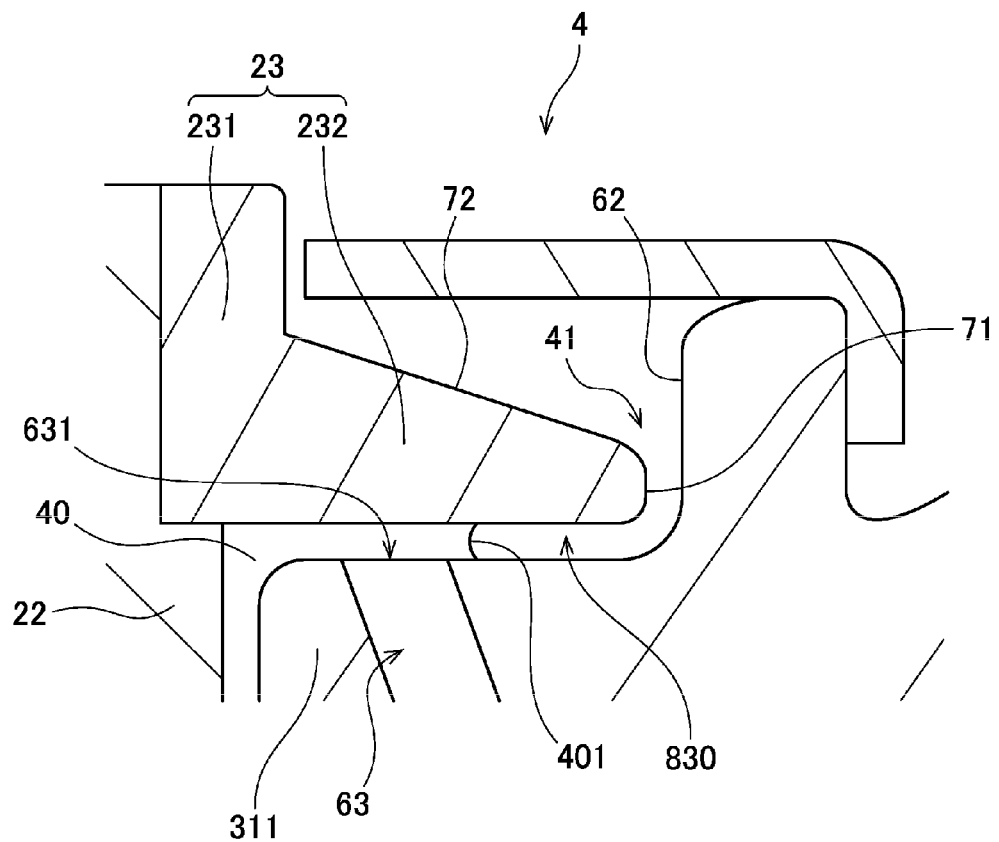
FIG. 10 is a partial vertical cross-sectional view of the fluid dynamic bearing apparatus according to the second preferred embodiment of the present invention.

The state of the spindle motor when running at the rated speed will now be described below with reference to FIGS. 9 and 10. FIG. 10 is a partial vertical cross-sectional view of the fluid dynamic bearing apparatus 4, illustrating the upper surface 401 of the lubricating oil 40 and its vicinity when the spindle motor 11 is running at the rated speed. Once the spindle motor 11 is started, the pumping groove array 831 causes the upper surface 401 of the lubricating oil 40 to move inward toward the interior of the bearing apparatus. Then, when the spindle motor 11 is running at the rated speed, the upper surface 401 is located where a pulling pressure caused by the pumping groove array 831 and a pressure in the interior of the bearing apparatus balance each other. Referring to FIG. 10, in the present preferred embodiment, the upper surface 401 of the lubricating oil 40 is located in the pumping seal portion 830 when the spindle motor 11 is running at the rated speed. Thus, at least a portion of the pumping groove array 831 is exposed outside of the lubricating oil 40. This contributes to more effectively preventing the lubricating oil 40 from leaking through the upper capillary seal portion 41.

However, if the upper surface 401 of the lubricating oil 40 is drawn up to the upper opening 631 of the communicating hole 63, air may enter into the communicating hole 63. Therefore, the upper surface 401 of the lubricating oil 40 is preferably located radially outward of the upper opening 631 of the communicating hole 63 when the spindle motor 11 is running at the rated speed.

In addition, according to the present preferred embodiment, a difference between the volume of the portion of the lubricating oil 40 which is held in the upper capillary seal portion 41 and the pumping seal portion 830 when the sleeve 311 is in the stationary state (i.e., the state illustrated in FIG. 5) and the volume of a portion of the lubricating oil 40 which is held in the pumping seal portion 830 when the sleeve 311 is rotating at the rated speed (i.e., the state illustrated in FIG. 10) is arranged to be smaller than the capacity of the margin portion 421 of the lower capillary seal portion 42. Accordingly, if the action of the pumping seal portion 830 causes the lower surface 402 of the lubricating oil 40 to rise, the lower surface 402 is preferably held perfectly in the margin portion 421. This contributes to more effectively preventing the lubricating oil 40 from leaking through the lower capillary seal portion 42.

While preferred embodiments of the present invention have been described above, it is to be understood that the present invention is not limited to the above-described preferred embodiments.

Figure 11:
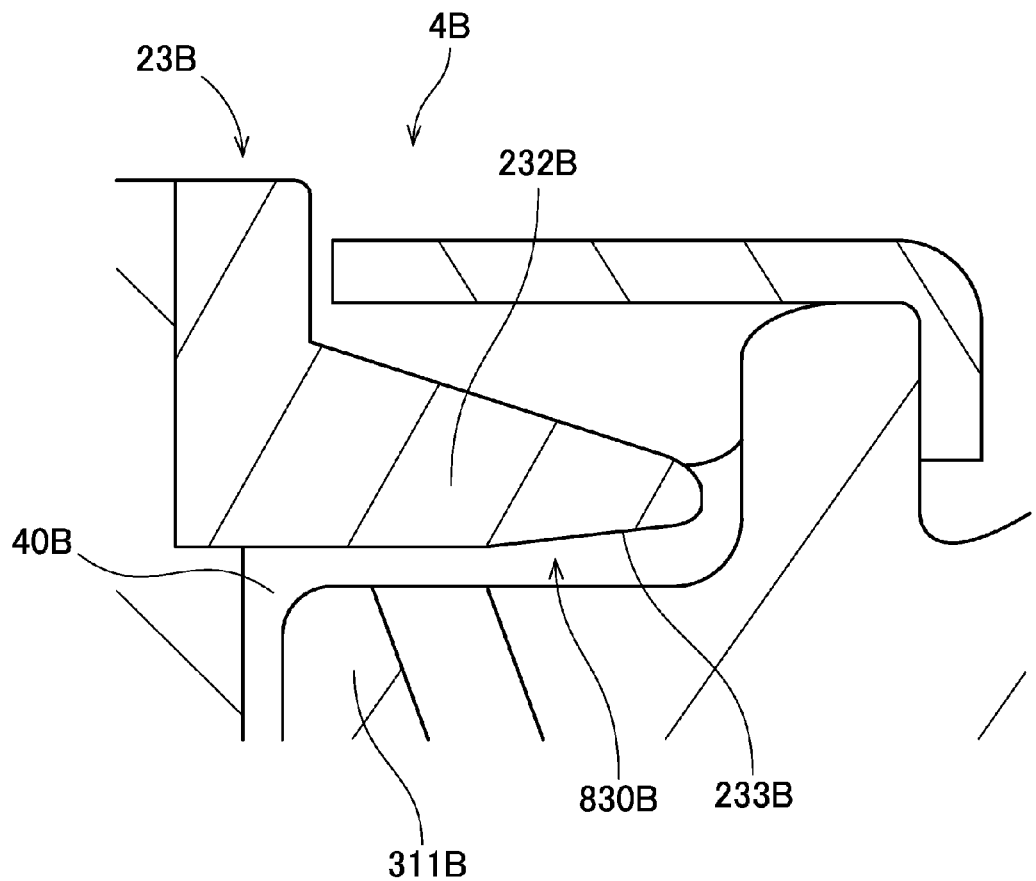
FIG. 11 is a partial vertical cross-sectional view of a fluid dynamic bearing apparatus according to a modification of the second preferred embodiment of the present invention.

FIG. 11 is a partial vertical cross-sectional view of a fluid dynamic bearing apparatus 4B according to a modification of the second preferred embodiment of the present invention. In the modification illustrated in FIG. 11, a lower surface of an upper annular portion 23B preferably includes a tapered surface 233B arranged to gradually increase in height with decreasing distance from a radially outer end portion thereof. More specifically, a lower surface of an annular projecting portion 232B of the upper annular portion 23B includes the tapered surface 233B. This causes the axial distance between an upper surface of a sleeve 311B and an outer portion of the lower surface of the upper annular portion 23B to gradually increase with increasing distance from the central axis. More specifically, the axial distance between the upper surface of the sleeve 311B and the tapered surface 233B is caused to gradually increase with increasing distance from the central axis. This contributes to preventing a contact between the upper annular portion 23B and the sleeve 311B in the vicinity of an outer circumferential portion of a pumping seal portion 830B, and thus preventing a contact between members exposed out of a lubricating oil 40B when the sleeve 311B is rotating at the rated speed.

Note that the lower surface of the upper annular portion 23B (more specifically, the lower surface of the annular projecting portion 232B) may alternatively be arranged to be a flat surface with the upper surface of the sleeve 311B including a tapered surface arranged to decrease in height with decreasing distance from a radially outer end portion thereof.

Figure 13:
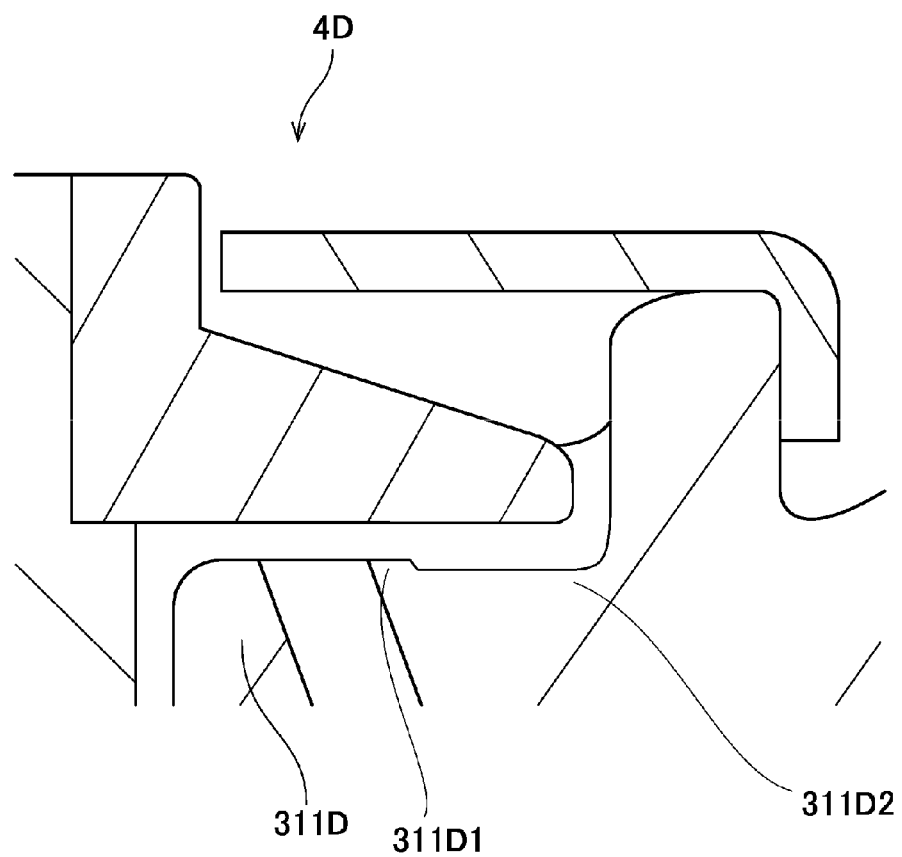
FIG. 13 is a partial vertical cross-sectional view of a fluid dynamic bearing apparatus according to a modification of the second preferred embodiment of the present invention.

Moreover, referring to FIG. 13, an upper surface of a sleeve 311D may be arranged to include a shoulder. FIG. 13 is a partial cross-sectional view of a fluid dynamic bearing apparatus 4D according to another modification of the second preferred embodiment of the present invention. In the modification illustrated in FIG. 13, the upper surface of the sleeve 311D preferably includes an inner upper surface 311D1 and an outer upper surface 311D2. The outer upper surface 311D2 is arranged axially below and radially outward of the inner upper surface 311D1. The inner upper surface 311D1 is arranged axially above and radially inward of the outer upper surface 311D2. In the modification illustrated in FIG. 13, the outer upper surface 311D2 is preferably defined by a single surface. However, the outer upper surface 311D2 may be defined by a plurality of surfaces.

Figure 14:
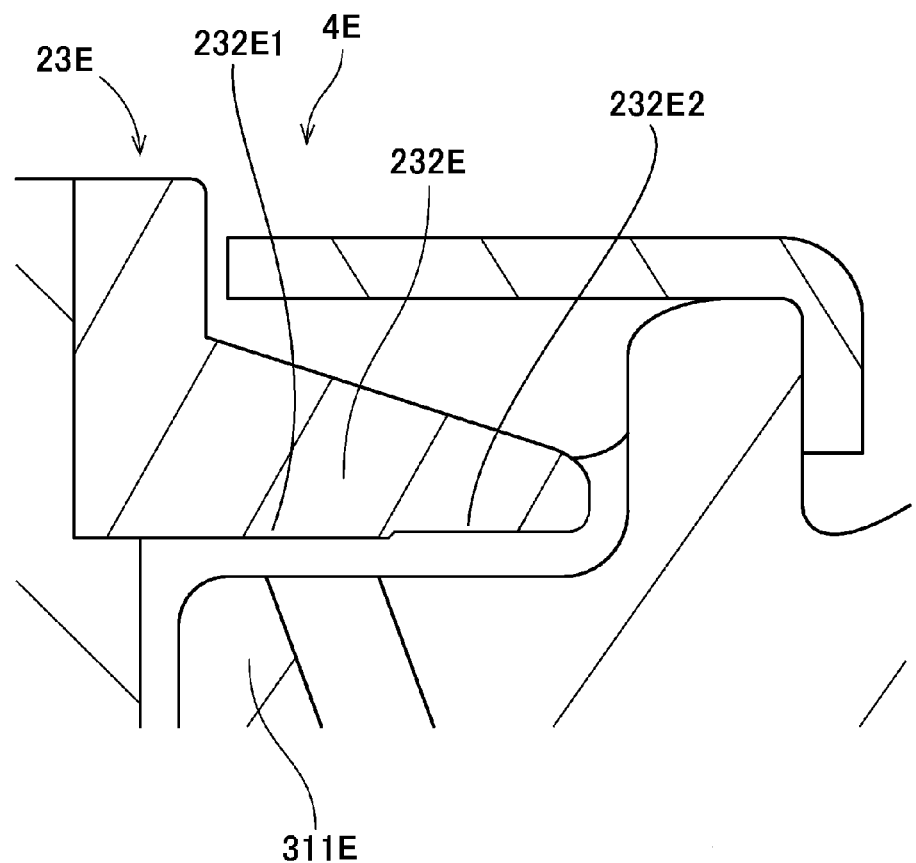
FIG. 14 is a partial vertical cross-sectional view of a fluid dynamic bearing apparatus according to a modification of the second preferred embodiment of the present invention.

FIG. 14 is a partial cross-sectional view of a fluid dynamic bearing apparatus 4E according to another modification of the second preferred embodiment of the present invention. In the modification illustrated in FIG. 14, an upper surface of a sleeve 311E may be arranged to be a flat surface with a lower surface of an upper annular portion 23E (more specifically, a lower surface of an annular projecting portion 232E) including a shoulder. In this case, the lower surface of the upper annular portion 23E (more specifically, the lower surface of the annular projecting portion 232E) includes an inner lower surface 232E1 and an outer lower surface 232E2, and the outer lower surface 232E2 is arranged axially above and radially outward of the inner lower surface 232E1.

Figure 12:
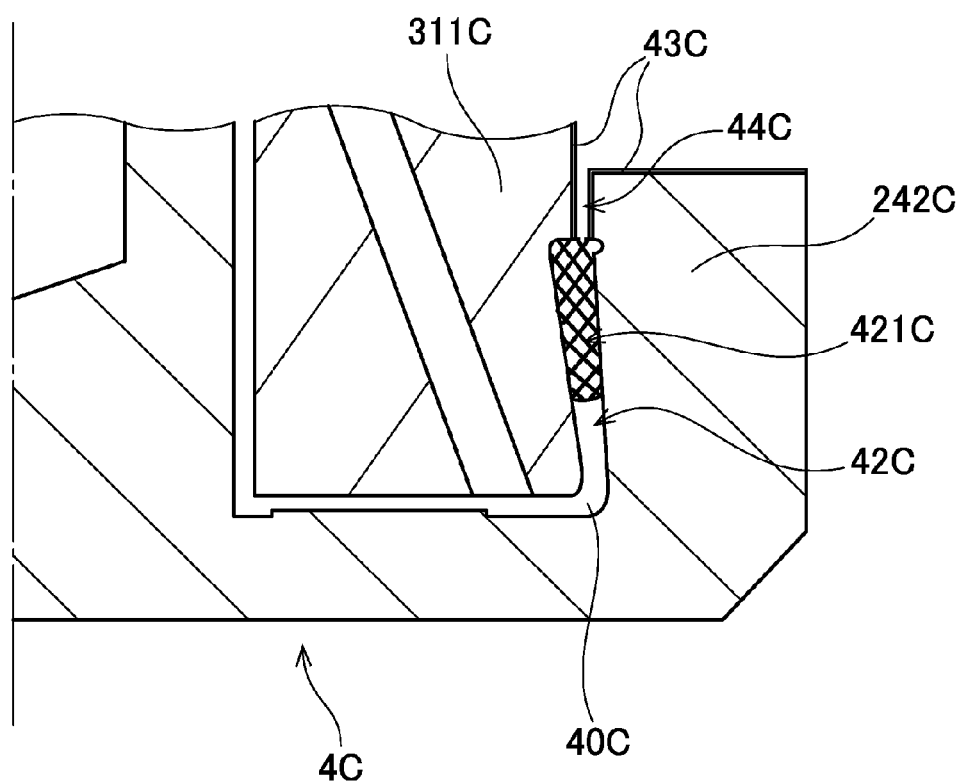
FIG. 12 is a partial vertical cross-sectional view of a fluid dynamic bearing apparatus according to a modification of the second preferred embodiment of the present invention.

FIG. 12 is a partial vertical cross-sectional view of a fluid dynamic bearing apparatus 4C according to another modification of the second preferred embodiment of the present invention. In the modification illustrated in FIG. 12, a labyrinth seal portion 44C is defined above a lower capillary seal portion 42C. The labyrinth seal portion 44C is defined by an outer circumferential surface of a sleeve 311C and an inner circumferential surface of a wall portion 242C. The radial distance between the sleeve 311C and the wall portion 242C is arranged to be shorter at the labyrinth seal portion 44C than at the lower capillary seal portion 42C.

In this modification, a portion of the lower capillary seal portion 42C which is located above a lower surface of a lubricating oil 40C and below the labyrinth seal portion 44C (i.e., a portion indicated by cross-hatching in FIG. 12) is a margin portion 421C. A portion of the outer circumferential surface of the sleeve 311C and a portion of the inner circumferential surface of the wall portion 242C which together define the labyrinth seal portion 44C are preferably covered with oil-repellent films 43C.

Note that a lower opening of a communicating hole may alternatively be defined in an outer circumferential surface of a sleeve in another modification of the second preferred embodiment of the present invention. That is, it is enough that the communicating hole should be arranged to connect an upper opening defined in an upper surface of the sleeve and a lower opening defined below the upper opening with each other. Also note that the sleeve may include a plurality of communicating holes if so desired.

Also note that the preferred embodiments of the present invention and the modifications thereof are also applicable to spindle motors arranged to rotate disks other than magnetic disks, such as, for example, optical disks. The preferred embodiments of the present invention and the modifications thereof are able to achieve, in particular, a reduction in axial thickness of the spindle motors. Therefore, the preferred embodiments of the present invention and the modifications thereof are particularly useful for spindle motors used in disk drive apparatuses designed for slim notebook PCs or tablet PCs.

Features of the above-described preferred embodiments and the modifications thereof may be combined appropriately as long as no conflict arises.

The preferred embodiments of the present invention and the modifications thereof are applicable to bearing apparatuses, spindle motors, and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A bearing apparatus comprising:
   a stationary shaft arranged to extend along a central axis extending in a vertical direction;
   an upper annular portion having a circular or substantially circular ring shape, and arranged to project radially outward from the stationary shaft;
   a lower annular portion having a circular or substantially circular ring shape, and arranged to project radially outward from the stationary shaft below the upper annular portion;
   a sleeve arranged between the upper and lower annular portions, and supported to be rotatable about the central axis; and
   a lubricating oil arranged between the sleeve and a combination of the stationary shaft, the upper annular portion, and the lower annular portion; wherein
   the lower annular portion includes:
      a bottom plate portion arranged to extend in or substantially in a shape of a disk below the sleeve; and
      a wall portion arranged to extend upward from the bottom plate portion to assume a cylindrical or substantially cylindrical shape radially outside of the sleeve;
   the sleeve includes:
      a first inner circumferential surface arranged radially opposite to an outer circumferential surface of the stationary shaft;
      a second inner circumferential surface arranged radially outside of the upper annular portion;
      an upper surface arranged axially opposite to a lower surface of the upper annular portion;
      a lower surface arranged axially opposite to an upper surface of the bottom plate portion; and an outer circumferential surface arranged radially opposite to an inner circumferential surface of the wall portion;
one of the upper surface of the sleeve and the lower surface of the upper annular portion includes a pumping groove array defined therein;
the pumping groove array is arranged to send a portion of the lubricating oil which is present between the sleeve and the upper annular portion radially inward during rotation of the sleeve;
the lower surface of the sleeve and the upper surface of the bottom plate portion are arranged to together define a thrust dynamic pressure bearing portion therebetween;
at least one of the lower surface of the sleeve and the upper surface of the bottom plate portion which together define the thrust dynamic pressure bearing portion includes a thrust dynamic pressure groove array arranged to draw a portion of the lubricating oil which is present between the sleeve and the bottom plate portion radially inward during the rotation of the sleeve;
an outer circumferential surface of the upper annular portion includes:
  a cylindrical surface arranged to have a uniform or substantially uniform outside diameter; and
  an inclined surface arranged to have an outside diameter gradually decreasing with increasing height from an upper end portion of the cylindrical surface;
the inclined surface and the second inner circumferential surface are arranged to together define an upper capillary seal portion arranged to gradually increase in radial dimension with increasing height;
an upper surface of the lubricating oil is defined in the upper capillary seal portion when the sleeve is in a stationary state;
the outer circumferential surface of the sleeve and the inner circumferential surface of the wall portion are arranged to together define a lower capillary seal portion arranged to gradually increase in radial dimension with increasing height;
a lower surface of the lubricating oil is defined in the lower capillary seal portion;
the sleeve includes an upper opening defined in the upper surface thereof, a lower opening defined below the upper opening, and a communicating hole arranged to connect the upper and lower openings with each other;
the upper opening is arranged radially inward of a radially outer end portion of the pumping groove array;
the lower opening is arranged radially outward of an inner circumferential portion of the thrust dynamic pressure bearing portion;
a radially outer edge of the lower opening is arranged at a radial position overlapping with an outer circumferential portion of the thrust dynamic pressure bearing portion, or radially outward of the outer circumferential portion of the thrust dynamic pressure bearing portion;
the cylindrical surface has an axial length smaller than that of the inclined surface;
the upper capillary seal portion has an opening angle larger than that of the lower capillary seal portion;
the lower capillary seal portion includes a margin portion arranged above the lower surface of the lubricating oil and below an upper end of the wall portion when the sleeve is in the stationary state; and
the margin portion has a capacity greater than a volume of a portion of the lubricating oil which is held in the upper capillary seal portion when the sleeve is in the stationary state.

2. The bearing apparatus according to claim 1, wherein an axial distance between the upper surface of the bottom plate portion and the lower surface of the sleeve is shorter than an axial distance between the lower surface of the upper annular portion and the upper surface of the sleeve when the sleeve is rotating at a rated speed.

3. The bearing apparatus according to claim 1, wherein
the opening angle of the upper capillary seal portion is about 45 or more degrees; and
the opening angle of the lower capillary seal portion is in a range of about 3 degrees to about 15 degrees.

4. The bearing apparatus according to claim 1, wherein
the lower surface of the upper annular portion and the upper surface of the sleeve are arranged to together define a pumping seal portion; and
when the sleeve is rotating at a rated speed, the upper surface of the lubricating oil is located in the pumping seal portion, and at least a portion of the pumping groove array is exposed outside of the lubricating oil.

5. The bearing apparatus according to claim 4, wherein the upper surface of the lubricating oil is located radially outward of the upper opening of the communicating hole when the sleeve is rotating at the rated speed.

6. The bearing apparatus according to claim 1, wherein
the lower surface of the upper annular portion and the upper surface of the sleeve are arranged to together define a pumping seal portion; and
a difference between a volume of a portion of the lubricating oil which is held in the upper capillary seal portion and the pumping seal portion when the sleeve is in the stationary state and a volume of a portion of the lubricating oil which is held in the pumping seal portion when the sleeve is rotating at a rated speed is smaller than the capacity of the margin portion of the lower capillary seal portion.

7. The bearing apparatus according to claim 1, wherein an axial distance between at least an outer portion of the lower surface of the upper annular portion and at least an outer portion of the upper surface of the sleeve is arranged to gradually increase with increasing distance from the central axis.

8. The bearing apparatus according to claim 1, wherein the upper surface of the sleeve includes an inner upper surface and an outer upper surface arranged axially below and radially outward of the inner upper surface.

9. The bearing apparatus according to claim 1, wherein the lower surface of the upper annular portion includes an inner lower surface and an outer lower surface arranged axially above and radially outward of the inner lower surface.

10. The bearing apparatus according to claim 1, wherein the upper surface of the lubricating oil is located radially outward of the upper opening of the communicating hole when the sleeve is rotating at a rated speed.

11. The bearing apparatus according to claim 1, wherein
a gap between the lower surface of the sleeve and the upper surface of the bottom plate portion includes a wide gap portion arranged radially outward of the thrust dynamic pressure bearing portion, and arranged to have an axial dimension greater than that of the thrust dynamic pressure bearing portion; and
the lower opening of the communicating hole is arranged to be open toward the wide gap portion.

12. The bearing apparatus according to claim 1, further comprising oil-repellent films arranged to cover a surface of the sleeve and a surface of the wall portion above the lower surface of the lubricating oil; wherein the lower annular portion includes an annular groove defined in the inner circumferential surface of the wall portion; and
each oil-repellent film is arranged above the annular groove.

13. The bearing apparatus according to claim 1, wherein
the pumping groove array includes a plurality of grooves, every adjacent pair of the plurality of grooves of the pumping groove array including a first hill surface defined therebetween;
the thrust dynamic pressure groove array includes a plurality of grooves, every adjacent pair of the plurality of grooves of the thrust dynamic pressure groove array including a second hill surface defined therebetween; and
the first hill surface has a circumferential width smaller than that of the second hill surface.

14. A spindle motor comprising:
the bearing apparatus of claim 1;
a stationary portion including the stationary shaft, the upper annular portion, and the lower annular portion;
a rotating portion including the sleeve and a support portion arranged to support a disk, and supported to be rotatable with respect to the stationary portion through the bearing apparatus; and
a stator and a magnet arranged to produce a torque centered on the central axis between the stationary and rotating portions.

15. The spindle motor according to claim 14, further comprising a labyrinth seal portion defined between the stationary and rotating portions and arranged radially outward of the lower capillary seal portion, wherein a distance between the stationary and rotating portions is shorter at the labyrinth seal portion than at the lower capillary seal portion.

16. A disk drive apparatus comprising:
the spindle motor of claim 14;
an access portion arranged to perform at least one of reading and writing of information from or to the disk supported by the rotating portion of the spindle motor; and
a housing arranged to contain the spindle motor and the access portion.

17. A bearing apparatus comprising:
a stationary shaft arranged to extend along a central axis extending in a vertical direction;
an upper annular portion having a circular or substantially circular ring shape, and arranged to project radially outward from the stationary shaft;
a lower annular portion having a circular or substantially circular ring shape, and arranged to project radially outward from the stationary shaft below the upper annular portion;
a sleeve arranged between the upper and lower annular portions, and supported to be rotatable about the central axis; and
a lubricating oil arranged between the sleeve and a combination of the stationary shaft, the upper annular portion, and the lower annular portion; wherein
the lower annular portion includes:
 a bottom plate portion arranged to extend in or substantially in a shape of a disk below the sleeve; and
 a wall portion arranged to extend upward from the bottom plate portion to assume a cylindrical or substantially cylindrical shape radially outside of the sleeve;
the sleeve includes:
 a first inner circumferential surface arranged radially opposite to an outer circumferential surface of the stationary shaft;
 a second inner circumferential surface arranged radially outside of the upper annular portion;
 an upper surface arranged axially opposite to a lower surface of the upper annular portion;
 a lower surface arranged axially opposite to an upper surface of the bottom plate portion; and
 an outer circumferential surface arranged radially opposite to an inner circumferential surface of the wall portion;
one of the upper surface of the sleeve and the lower surface of the upper annular portion includes a pumping groove array defined therein;
the pumping groove array is arranged to send a portion of the lubricating oil which is present between the sleeve and the upper annular portion radially inward during rotation of the sleeve;
the lower surface of the sleeve and the upper surface of the bottom plate portion are arranged to together define a thrust dynamic pressure bearing portion therebetween;
at least one of the lower surface of the sleeve and the upper surface of the bottom plate portion which together define the thrust dynamic pressure bearing portion includes a thrust dynamic pressure groove array arranged to draw a portion of the lubricating oil which is present between the sleeve and the bottom plate portion radially inward during the rotation of the sleeve;
an outer circumferential surface of the upper annular portion includes:
 a cylindrical surface arranged to have a uniform or substantially uniform outside diameter; and
 an inclined surface arranged to have an outside diameter gradually decreasing with increasing height from an upper end portion of the cylindrical surface;
the inclined surface and the second inner circumferential surface are arranged to together define an upper capillary seal portion arranged to gradually increase in radial dimension with increasing height;
an upper surface of the lubricating oil is defined in the upper capillary seal portion when the sleeve is in a stationary state;
the outer circumferential surface of the sleeve and the inner circumferential surface of the wall portion are arranged to together define a lower capillary seal portion arranged to gradually increase in radial dimension with increasing height;
a lower surface of the lubricating oil is defined in the lower capillary seal portion;
a labyrinth seal portion having a radial dimension smaller than that of the lower capillary seal portion is arranged above the lower capillary seal portion;
the sleeve includes an upper opening defined in the upper surface thereof, a lower opening defined below the upper opening, and a communicating hole arranged to connect the upper and lower openings with each other;
the upper opening is arranged radially inward of a radially outer end portion of the pumping groove array;
the lower opening is arranged radially outward of an inner circumferential portion of the thrust dynamic pressure bearing portion;
a radially outer edge of the lower opening is arranged at a radial position overlapping with an outer circumferential portion of the thrust dynamic pressure bearing portion, or radially outward of the outer circumferential portion of the thrust dynamic pressure bearing portion;
the cylindrical surface has an axial length smaller than that of the inclined surface;

the upper capillary seal portion has an opening angle larger than that of the lower capillary seal portion;

the lower capillary seal portion includes a margin portion arranged above the lower surface of the lubricating oil and below the labyrinth seal portion when the sleeve is in the stationary state; and the margin portion has a capacity greater than a volume of a portion of the lubricating oil which is held in the upper capillary seal portion when the sleeve is in the stationary state.

18. The bearing apparatus according to claim 17, wherein an axial distance between the upper surface of the bottom plate portion and the lower surface of the sleeve is shorter than an axial distance between the lower surface of the upper annular portion and the upper surface of the sleeve when the sleeve is rotating at a rated speed.

19. The bearing apparatus according to claim 17, wherein
the opening angle of the upper capillary seal portion is about 45 or more degrees; and
the opening angle of the lower capillary seal portion is in a range of about 3 degrees to about 15 degrees.

20. The bearing apparatus according to claim 17, wherein
the lower surface of the upper annular portion and the upper surface of the sleeve are arranged to together define a pumping seal portion; and
when the sleeve is rotating at a rated speed, the upper surface of the lubricating oil is located in the pumping seal portion, and at least a portion of the pumping groove array is exposed outside of the lubricating oil.

21. The bearing apparatus according to claim 20, wherein the upper surface of the lubricating oil is located radially outward of the upper opening of the communicating hole when the sleeve is rotating at the rated speed.

22. The bearing apparatus according to claim 17, wherein
the lower surface of the upper annular portion and the upper surface of the sleeve are arranged to together define a pumping seal portion; and
a difference between a volume of a portion of the lubricating oil which is held in the upper capillary seal portion and the pumping seal portion when the sleeve is in the stationary state and a volume of a portion of the lubricating oil which is held in the pumping seal portion when the sleeve is rotating at a rated speed is smaller than the capacity of the margin portion of the lower capillary seal portion.

23. The bearing apparatus according to claim 17, wherein an axial distance between at least an outer portion of the lower surface of the upper annular portion and at least an outer portion of the upper surface of the sleeve is arranged to gradually increase with increasing distance from the central axis.

24. The bearing apparatus according to claim 17, wherein the upper surface of the sleeve includes an outer upper surface and an inner upper surface arranged axially above and radially inward of the outer upper surface.

25. The bearing apparatus according to claim 17, wherein the lower surface of the upper annular portion includes an inner lower surface and an outer lower surface arranged axially above and radially outward of the inner lower surface.

26. The bearing apparatus according to claim 17, wherein the upper surface of the lubricating oil is located radially outward of the upper opening of the communicating hole when the sleeve is rotating at a rated speed.

27. The bearing apparatus according to claim 17, wherein
a gap between the lower surface of the sleeve and the upper surface of the bottom plate portion includes a wide gap portion arranged radially outward of the thrust dynamic pressure bearing portion, and arranged to have an axial dimension greater than that of the thrust dynamic pressure bearing portion; and
the lower opening of the communicating hole is arranged to be open toward the wide gap portion.

28. The bearing apparatus according to claim 17, further comprising oil-repellent films arranged to cover a surface of the sleeve and a surface of the wall portion above the lower surface of the lubricating oil; wherein
the lower annular portion includes an annular groove defined in the inner circumferential surface of the wall portion; and
each oil-repellent film is arranged above the annular groove.

29. The bearing apparatus according to claim 17, wherein
the pumping groove array includes a plurality of grooves, every adjacent pair of the plurality of grooves of the pumping groove array including a first hill surface defined therebetween;
the thrust dynamic pressure groove array includes a plurality of grooves, every adjacent pair of the plurality of grooves of the thrust dynamic pressure groove array including a second hill surface defined therebetween; and
the first hill surface has a circumferential width smaller than that of the second hill surface.

30. A spindle motor comprising:
the bearing apparatus of claim 17;
a stationary portion including the stationary shaft, the upper annular portion, and the lower annular portion;
a rotating portion including the sleeve and a support portion arranged to support a disk, and supported to be rotatable with respect to the stationary portion through the bearing apparatus; and
a stator and a magnet arranged to produce a torque centered on the central axis between the stationary and rotating portions.

31. The spindle motor according to claim 30, further comprising a labyrinth seal portion defined between the stationary and rotating portions and arranged radially outward of the lower capillary seal portion, wherein a distance between the stationary and rotating portions is shorter at the labyrinth seal portion than at the lower capillary seal portion.

32. A disk drive apparatus comprising:
the spindle motor of claim 30;
an access portion arranged to perform at least one of reading and writing of information from or to the disk supported by the rotating portion of the spindle motor; and
a housing arranged to contain the spindle motor and the access portion.

* * * * *